MECHANISM FOR WINDING COIL HEADS OF STATORS

Filed May 18, 1965 17 Sheets-Sheet 1

Inventors
Willi Muskulus
Josef Möller
By Bailey, Stephens & Huettig
Attorneys

Inventors
WILLI MUSKULUS
JOSEF MÜLLER
BY Bailey, Stephens & Huettig
ATTORNEYS

Oct. 3, 1967 W. MUSKULUS ETAL 3,344,760

MECHANISM FOR WINDING COIL HEADS OF STATORS

Filed May 18, 1965 17 Sheets-Sheet 3

Inventors

WILLI MUSKULUS

JOSEF MÜLLER

BY Bailey, Stephens & Huettig

ATTORNEYS

Inventors
Willi Muskulus
Josef Müller
By Bailey, Stephens & Huettig
ATTORNEYS

Inventors
WILLI MUSKULUS
JOSEF MÜLLER
BY Bailey, Stephens & Huettig
ATTORNEYS

Inventors
Willi Muskulus
Josef Müller
By Bailey, Stephens & Huettig
Attorneys

MECHANISM FOR WINDING COIL HEADS OF STATORS

Filed May 18, 1965

Inventors
Willi Muskulus
Josef Müller
By Bailey, Stephens & Huettig
Attorneys

Inventors
WILLI MUSKULUS
JOSEF MÜLLER
BY Bailey, Stephens & Huettig
ATTORNEYS

MECHANISM FOR WINDING COIL HEADS OF STATORS

Filed May 18, 1965

Inventors
Willi Muskulus
Josef Möller
By Bailey, Stephens & Huettig
Attorneys

Inventors

Willi Muskulus
Josef Müller

By Bailey, Stephens & Huettig
ATTORNEYS

Inventors
Willi Muskulus
Josef Müller
By Bailey, Stephens & Huettig
Attorneys

MECHANISM FOR WINDING COIL HEADS OF STATORS

Filed May 18, 1965

Inventors
Willi Muskulus
Josef Müller
By Bailey, Stephens & Huettig
ATTORNEYS

MECHANISM FOR WINDING COIL HEADS OF STATORS

Filed May 18, 1965

17 Sheets-Sheet 13

Inventors
Willi Muskulus
Josef Müller
By Bailey, Stephens & Huettig
Attorneys

Inventors
WILLI MUSKULUS
JOSEF MÜLLER
BY Bailey, Stephens & Huettig
ATTORNEYS

MECHANISM FOR WINDING COIL HEADS OF STATORS
Filed May 18, 1965 17 Sheets-Sheet 15
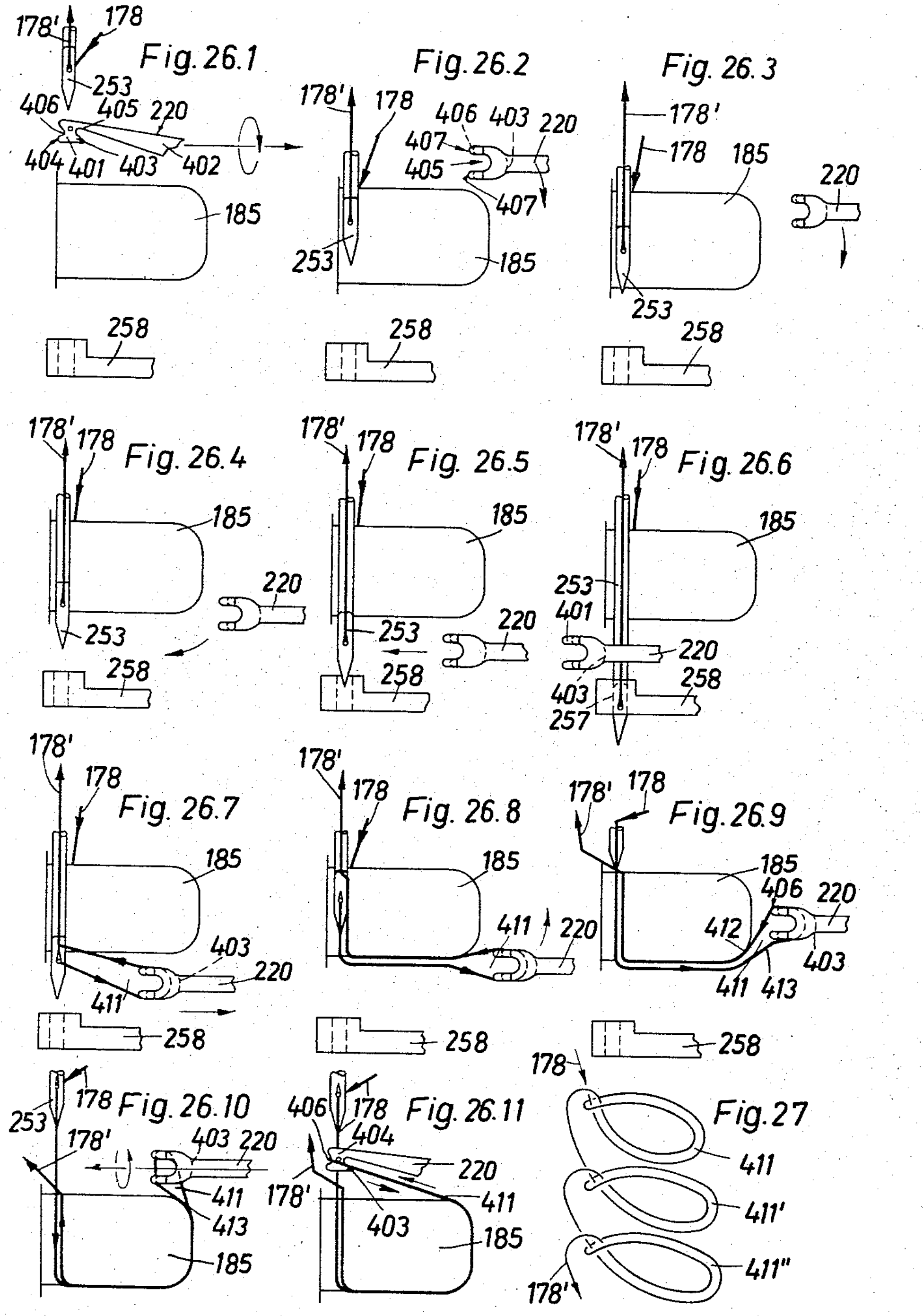
Fig. 26.1, Fig. 26.2, Fig. 26.3, Fig. 26.4, Fig. 26.5, Fig. 26.6, Fig. 26.7, Fig. 26.8, Fig. 26.9, Fig. 26.10, Fig. 26.11, Fig. 27
Inventors
WILLI MUSKULUS
JOSEF MÜLLER
BY Bailey, Stephens & Huettig
ATTORNEYS

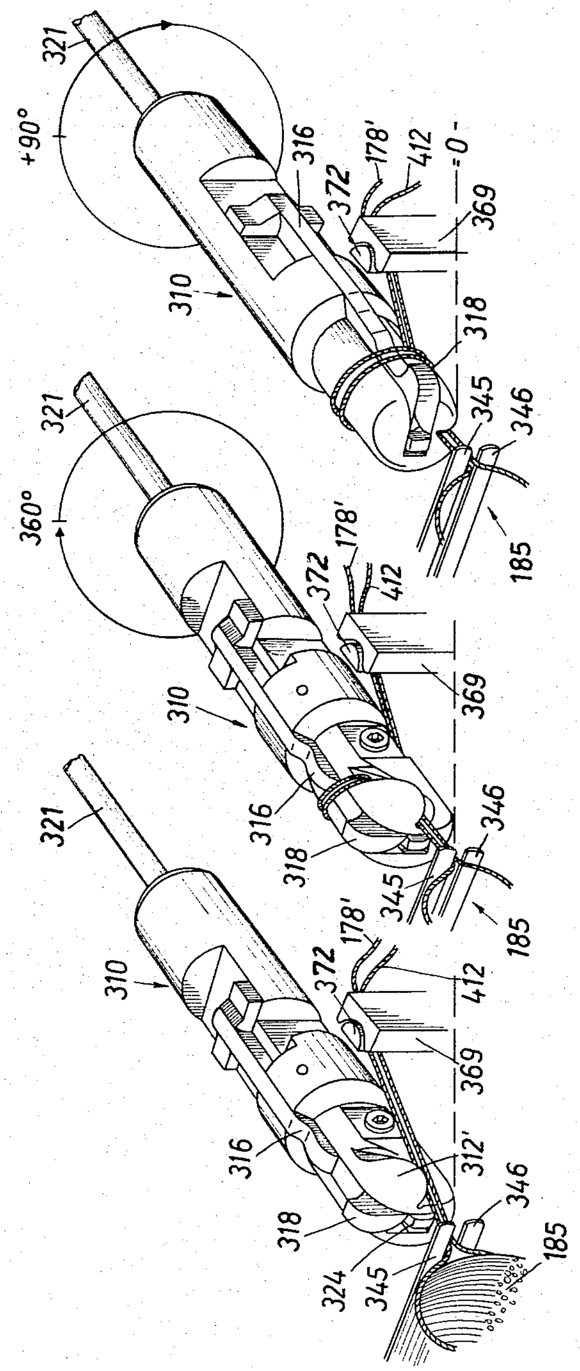
Fig. 29.3 Fig. 29.2 Fig. 29.1
Inventors
Willi Muskulus
Josef Müller
By Bailey, Stephens & Huettig
ATTORNEYS Oct. 3, 1967 W. MUSKULUS ET AL 3,344,760
MECHANISM FOR WINDING COIL HEADS OF STATORS
Filed May 18, 1965 17 Sheets-Sheet 17
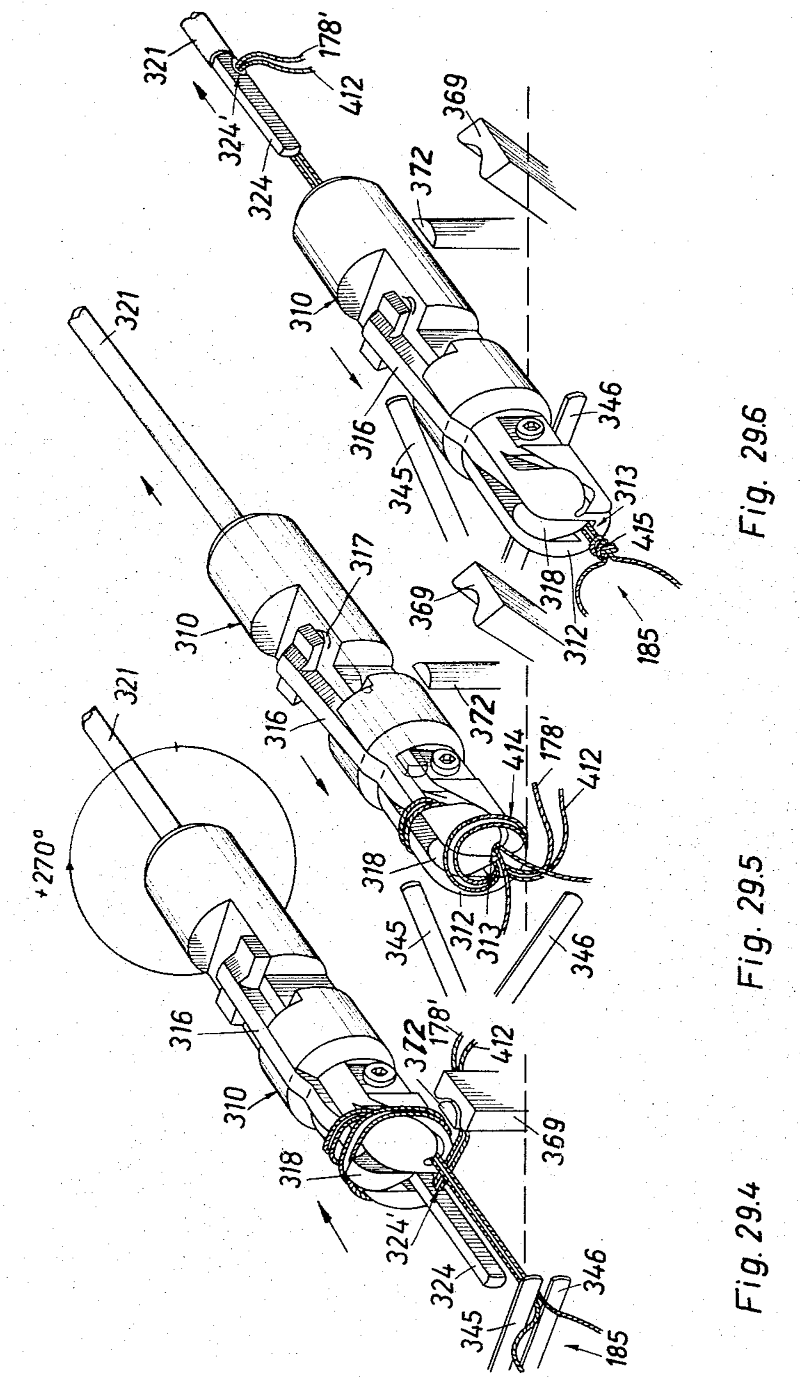
Fig. 29.6, Fig. 29.5, Fig. 29.4
Inventors
Willi Muskulus
Josef Müller
By Bailey, Stephens & Huettig
Attorneys

United States Patent Office 3,344,760

Patented Oct. 3, 1967

3,344,760

MECHANISM FOR WINDING COIL HEADS OF STATORS

Willi Muskulus and Josef Muller, both of Bergen-Enkheim, Germany, assignors to Balazer & Droll Schnitt- u. Werkzeugbau, Bergen-Enkheim, Germany Filed May 18, 1965, Ser. No. 456,648

Claims priority, application Germany, May 30, 1964, B 77,000

58 Claims. (Cl. 112—2)

The invention relates to the arrangement for the automatic winding, lacing or wrapping of coil heads of windings laid in the grooves of a stator body of an electric machine.

In known arrangements by which the winding of the coil heads is carried out mechanically and in an automatic working sequence, the stators to be wound are put into a holder which is turned step by step in accordance with the divisions of the grooves, the coil heads which extend out from the face of the stator are wound by means of a needle and a thread holder with a thread running off from a supply spool with continuous formation and interlacing of thread loops in a transverse or substantially transverse direction. For this purpose first a thread loop is pulled inside the coil head with the thread carried through by the needle by means of the thread holder, and is led back by the thread holder outside the coil head into the range of the needle, while the stator is turned through one slot. The needle now pushes the thread running off from the supply spool through this thread loop, while this loop slides off of the thread holder and the thread is stretched tightly to lie on the coil. The thread holder then runs back idle in its position inside the coil head, draws a new thread loop around the coil head and interlaces this with the next following thread. This procedure goes on until the coil head is wound over its whole periphery. Subsequently the two thread ends, that is, the beginning and end of the winding, are knotted together by hand.

The invention has the purpose of improving such an arrangement, in such a way that the whole winding procedure is speeded up and that the knotting of the winding is carried out mechanically. To achieve this purpose, according to the invention the winding arrangement is provided with a carrying and transporting arrangement for the stators and a knot tying arrangement associated one after the other, and all the mechanisms are so arranged with respect to each other and are arranged to cooperate in such a way that from the supplying of the stator to be wound up to its removal a completely automatic sequence of movements and operations is assured. Because, in a stator, the coil heads extend from both faces, a winding and a knotting mechanism are arranged one on each side of guides which extend along the whole apparatus and carry the stator in perpendicular position. In the known arrangements, the stator during the winding is shifted step by step in accordance with the grooves through 360°, whereas the needle and the thread holder always maintain the same position in the arrangement. By the construction according to the invention, on the contrary, the stator remains stationary with respect to the winding arrangement, whereas the needle and thread holder during the taping are moved around the central axis of the stator in a circle of 360° step by step. This arrangement in connection with the mechanical knotting provides for a substantial increase in speed of operation of the whole device.

Further objects and advantages of the invention will appear more fully from the following description, particularly when taken in conjunction with the accompanying drawings which form a part thereof.

Figure 11A:
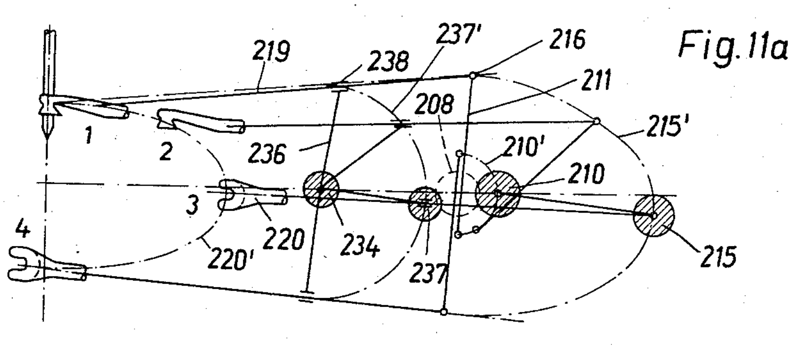
FIG. 11 is a perpendicular cross-section through the needle and thread holder drive of the winding arrangement on the line XI—XI of FIG. 12.
Figure 11:
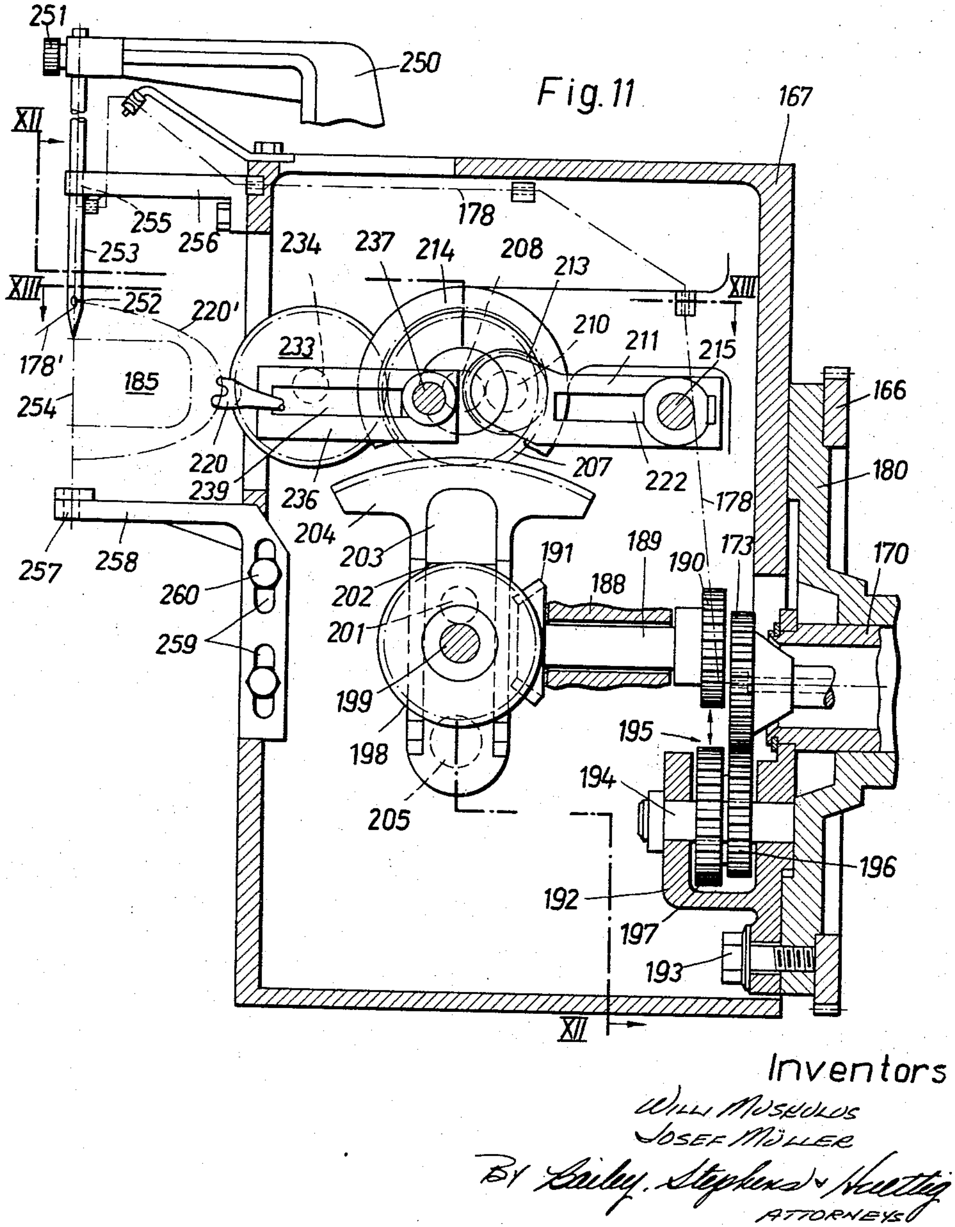
Figure 12:
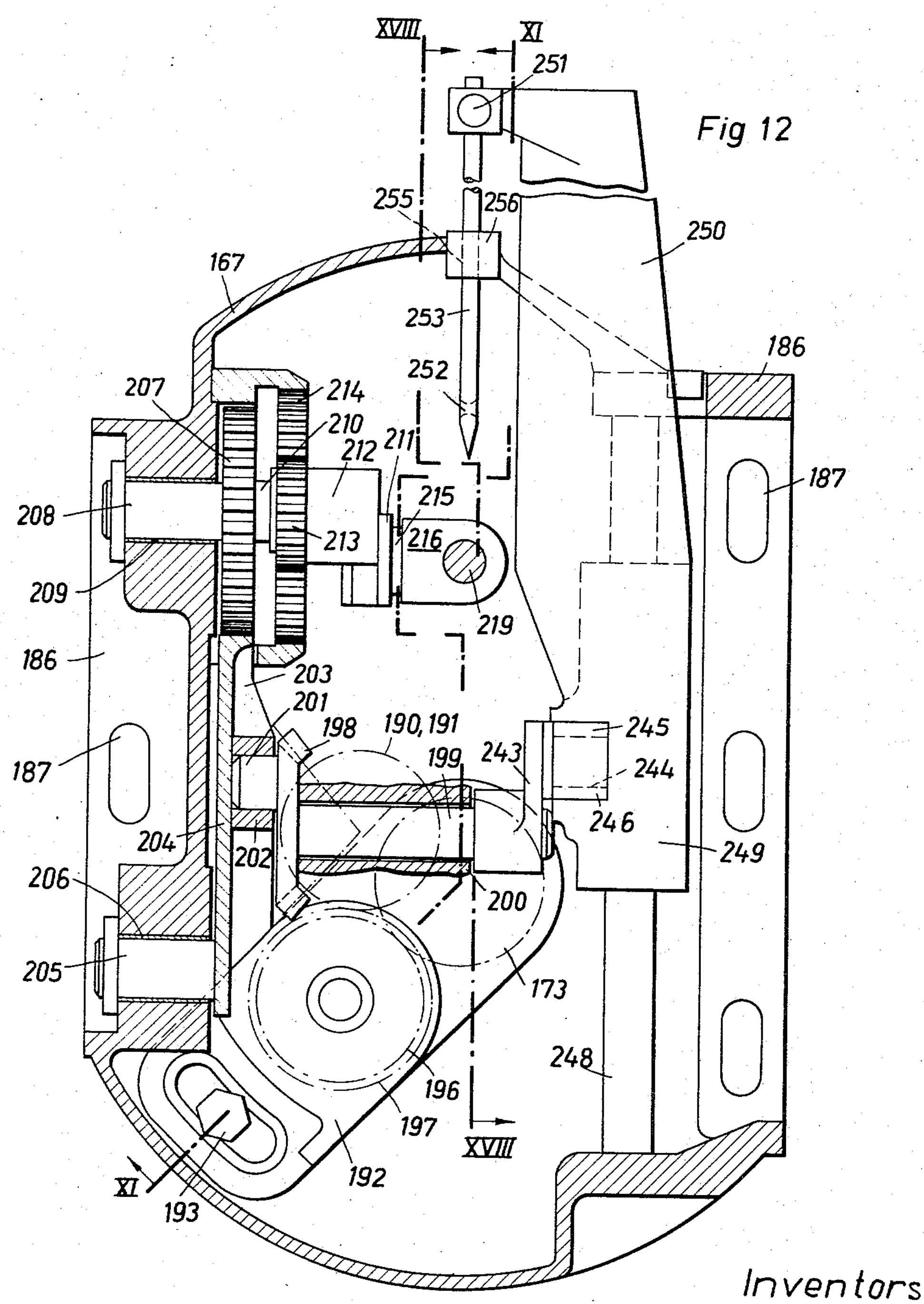
Figures 13, 14, 15, 16, 16A, 17, 17A:
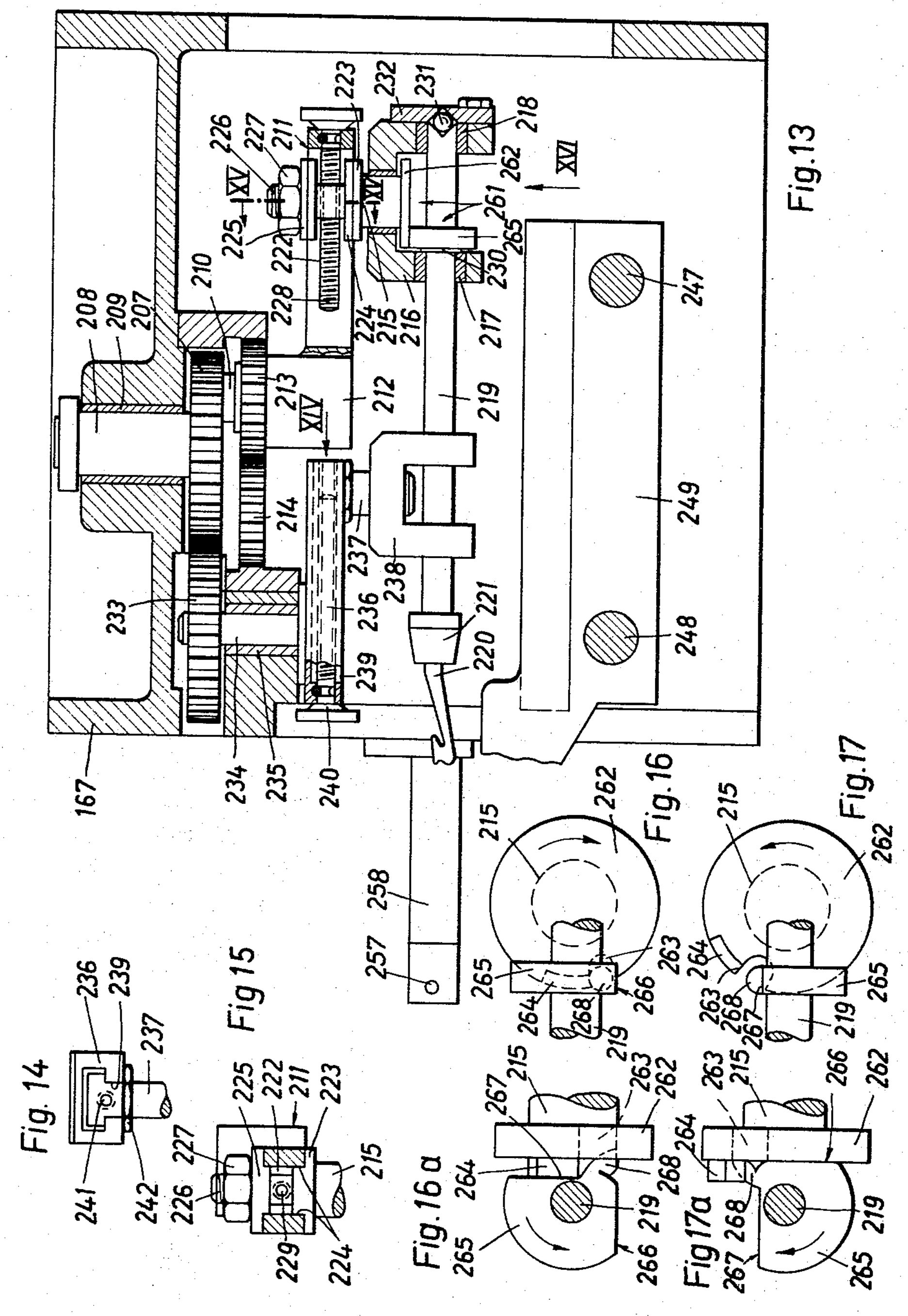
Figure 18:
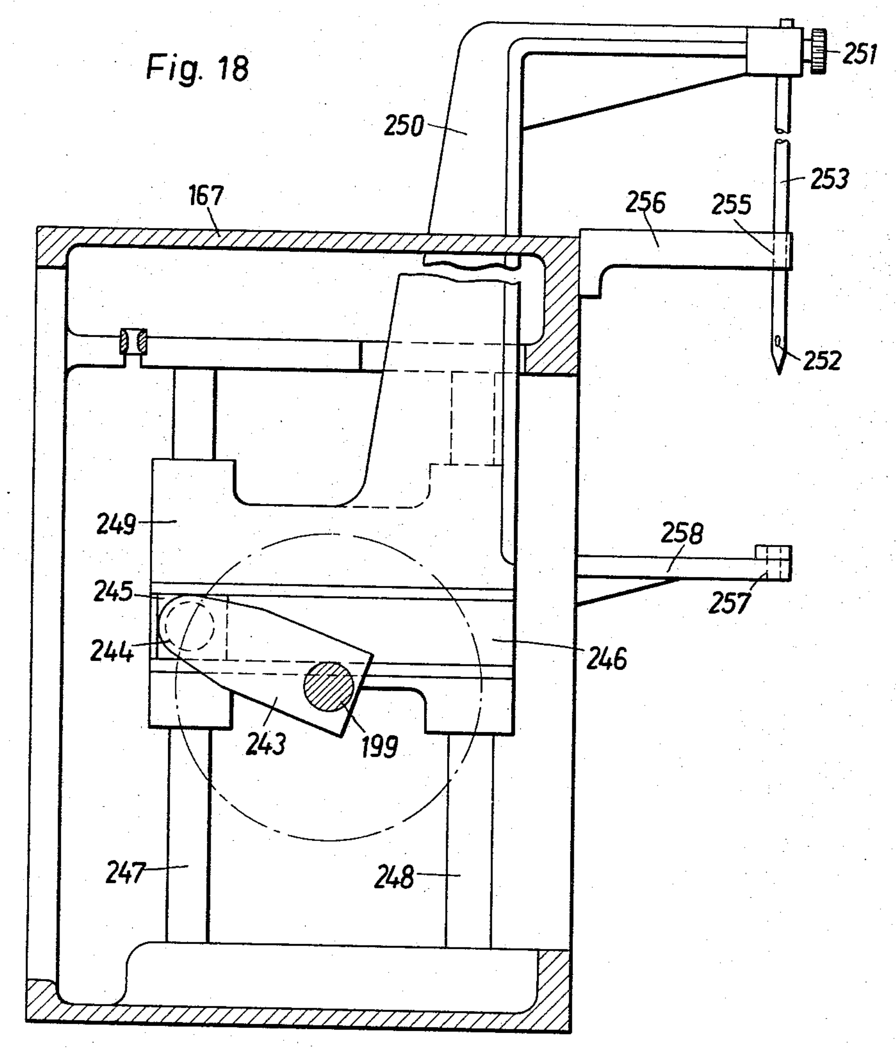
Figure 19:
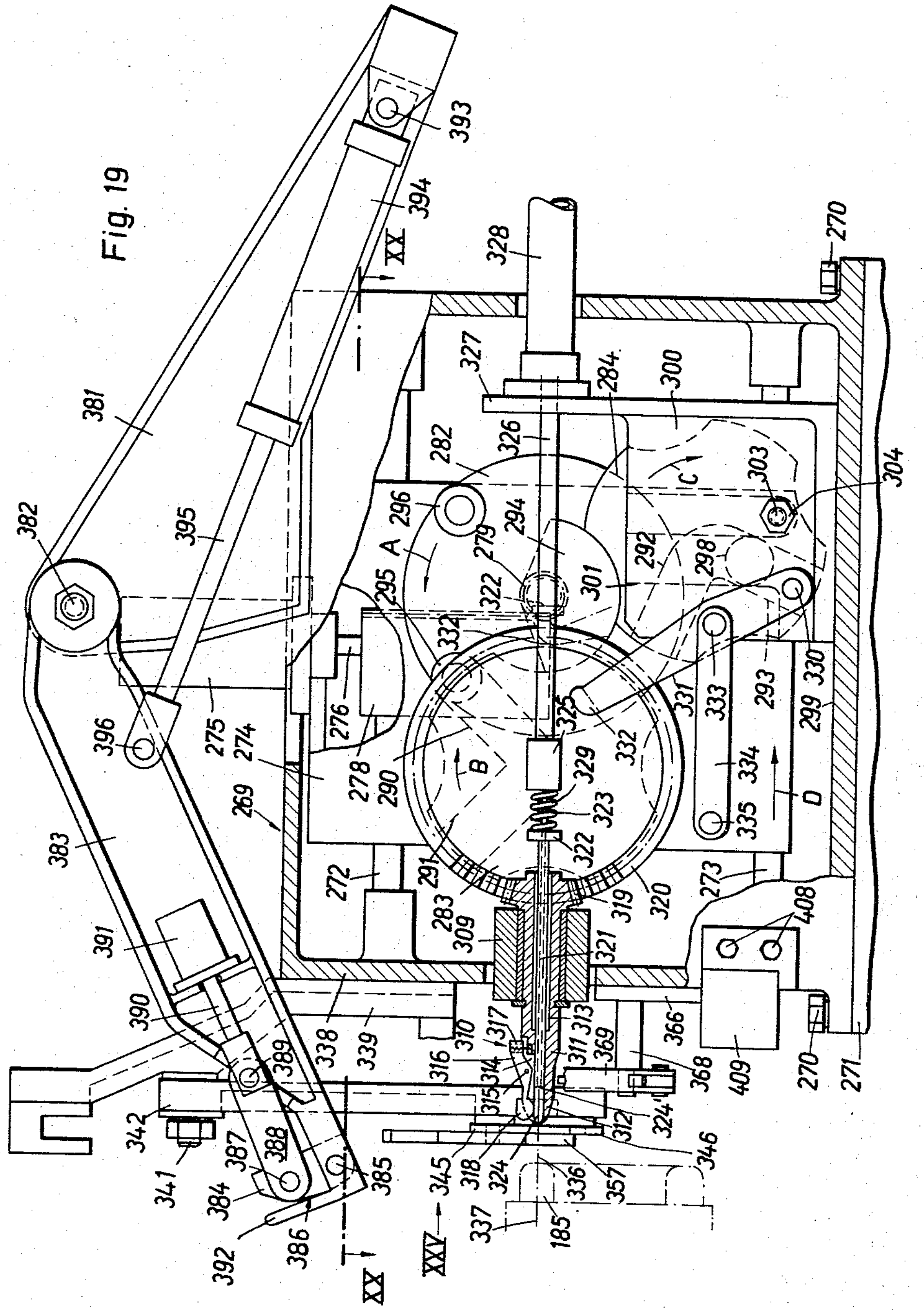
Figures 19A, 19B, 19C, 21, 22, 23, 24:
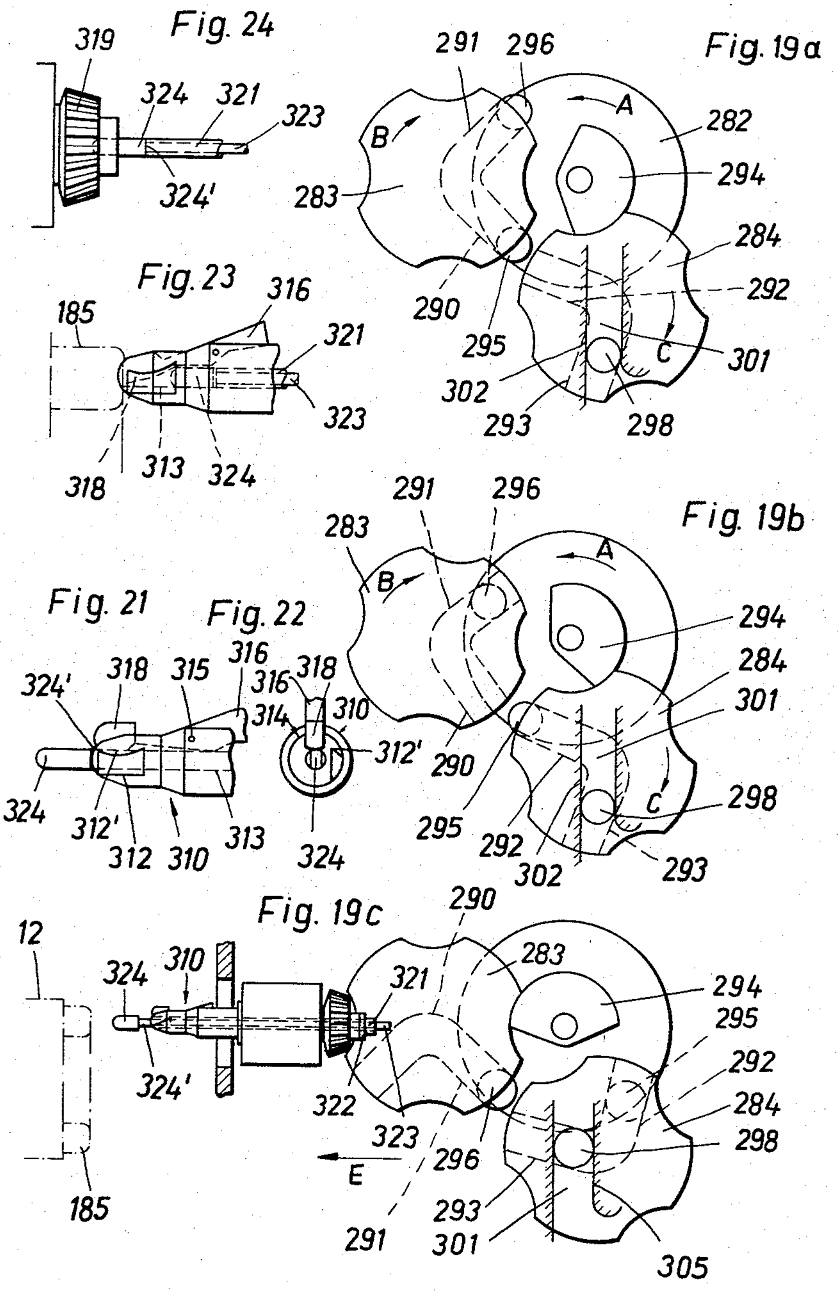
Figures 20, 28:
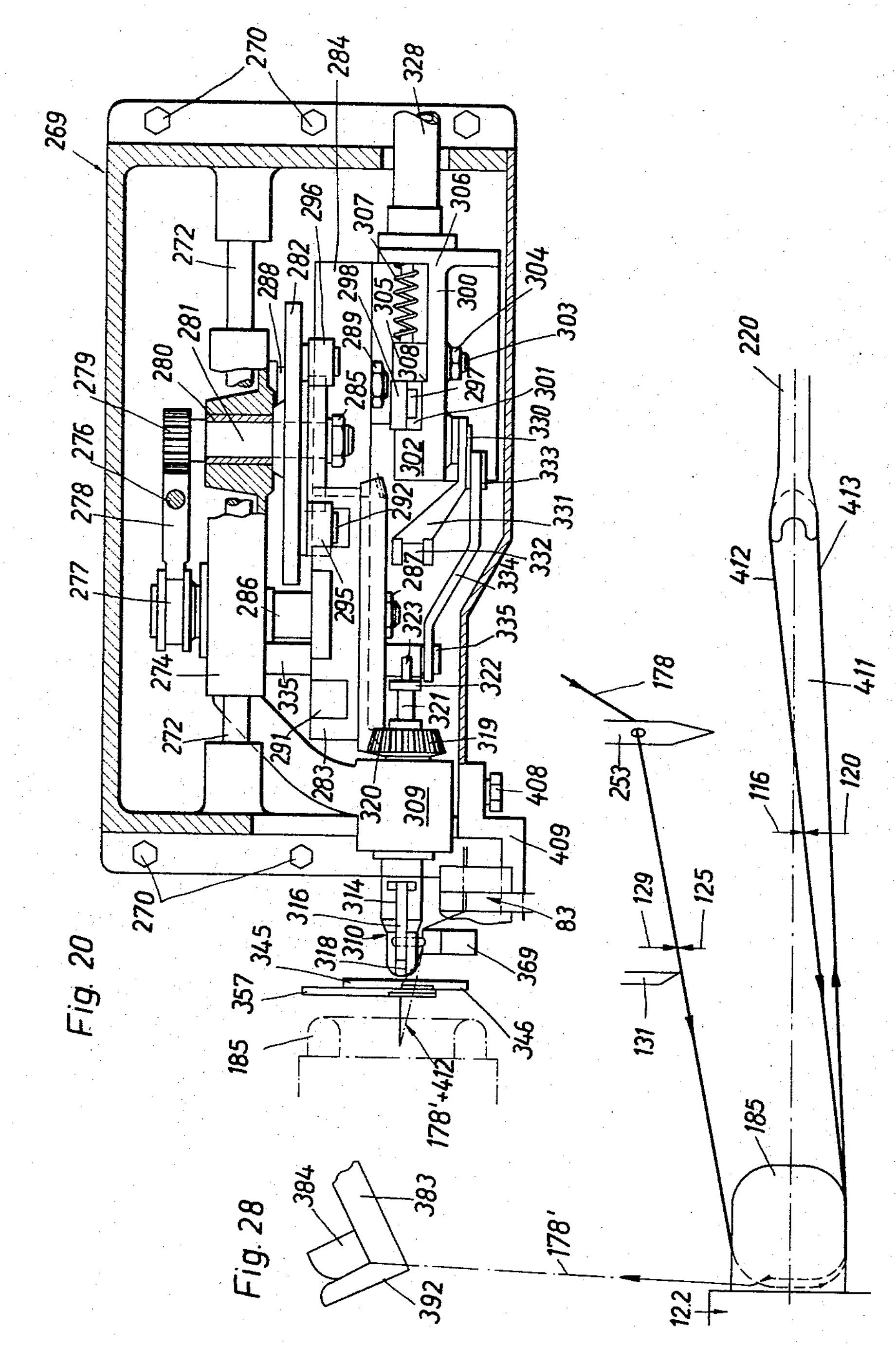
Figure 25:
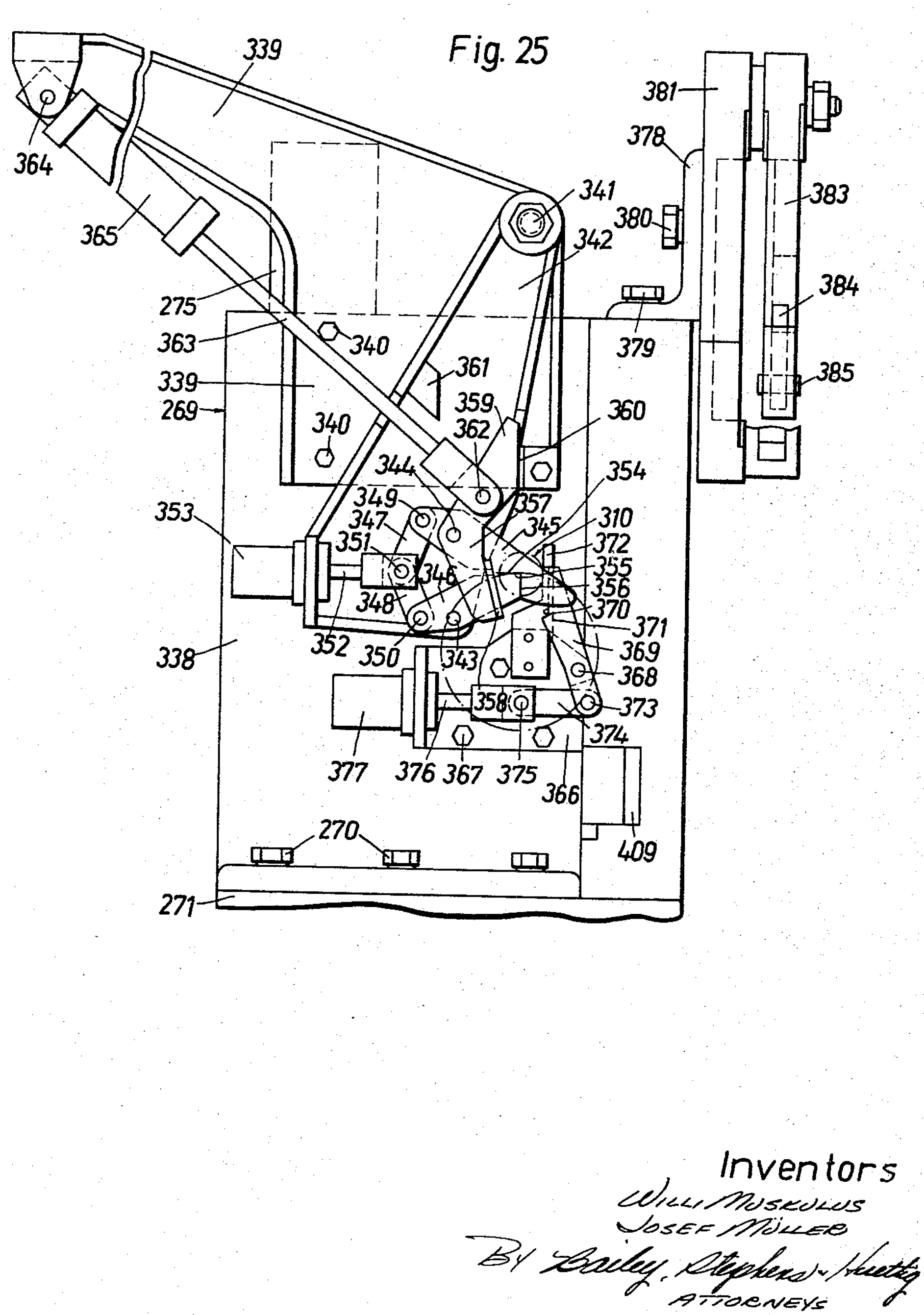

FIG. 11*a* is a diagram showing the path of movement of the thread holder and the crank pin;

FIG. 12 is a perpendicular cross-section through the needle and thread lifter drive on the line XII—XII of FIG. 11;

FIG. 13 is a horizontal section through the needle and thread holder drive on the line XIII—XIII of FIG. 11;

FIG. 14 is an end view of the crank in the direction of the arrow XIV of FIG. 13;

FIG. 15 is a perpendicular cross section through the crank on the line XV—XV of FIG. 13;

FIGS. 16 and 16*a* are an end view and a side view of the turning arrangement for the thread holder in the direction of the arrow XVI of FIG. 13;

FIGS. 17 and 17*a* are similar views of the turning arrangement of FIGS. 16, 16*a*, in another position of turning;

FIG. 18 is a vertical cross-section through the needle and thread holder drive on the line XVIII—XVIII of FIG. 12;

FIG. 19 is a vertical cross-section through the mechanism of the knotting arrangement;

FIGS. 19*a* to 19*c* show different positions of the Maltese cross of the drive according to FIG. 19;

FIG. 20 is a horizontal cross-section through the drive on the line XX—XX of FIG. 19;

FIG. 21 is one particular position of the knotting head during the knotting procedure;

FIG. 22 is an end view of the knotting head in the position of FIG. 21;

FIG. 23 shows further positions of the knotting head during the knotting operation;

FIG. 24 shows one position of the needle head and the needle sleeve during the knotting operation;

FIG. 25 is a view of the housing of the knotting arrangement in the direction of the arrow XXV in FIG. 19;

FIGS. 26.1 to 26.11 show different phases of the winding procedure;

FIG. 27 shows the path of the thread during covering;

FIG. 28 shows the path of the thread during the clamping of the thread after the winding procedure;

FIGS. 29.1 to 29.6 show different positions of the knotting head and different phases of the formation of the knot.

On a horizontally arranged machine frame 1, which can be levelled exactly by adjustable feet 2, are arranged a first transporting cart 3, left hand and right hand winding or wrapping arrangements 4 and 5, left hand and right hand knotting arrangements 6 and 7 and a second transporting cart 3'. The carts 3, 3' form stator carriers.

Figure 1:
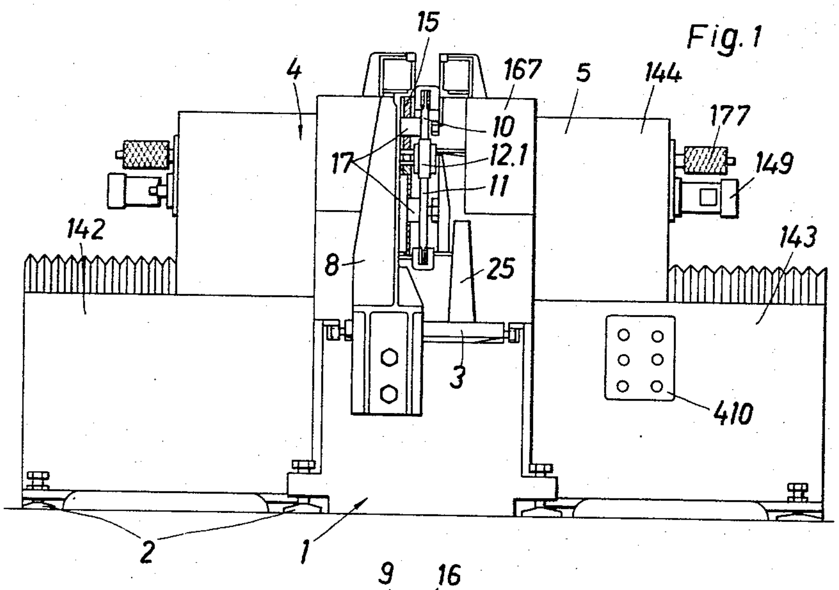
FIG. 1 shows a front view of the apparatus embodying the invention.
Figure 2:
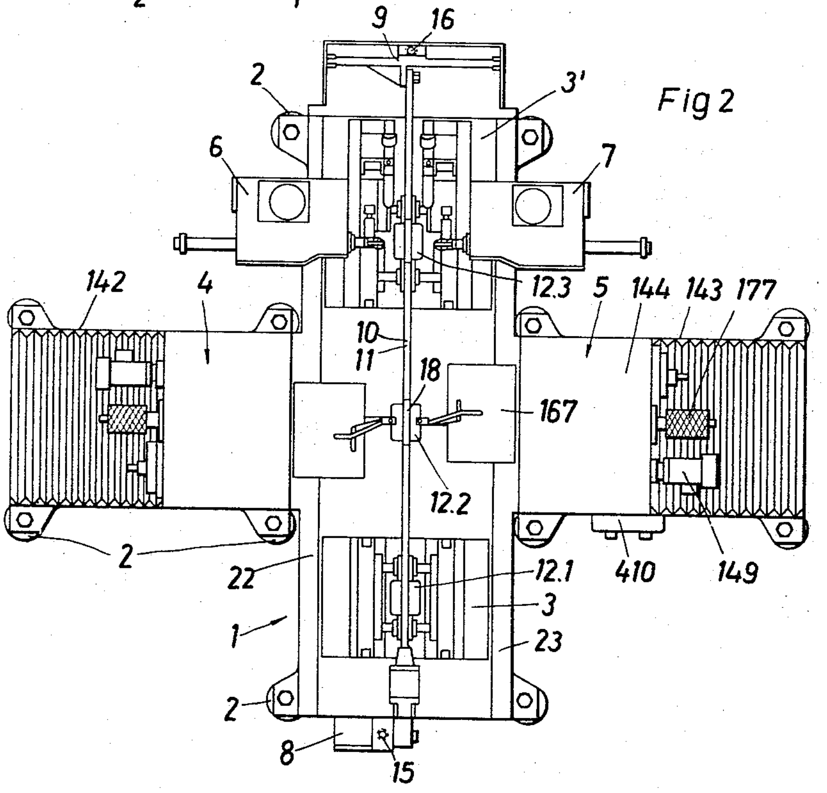
FIG. 2 is a top plan view thereof.
Figure 5:
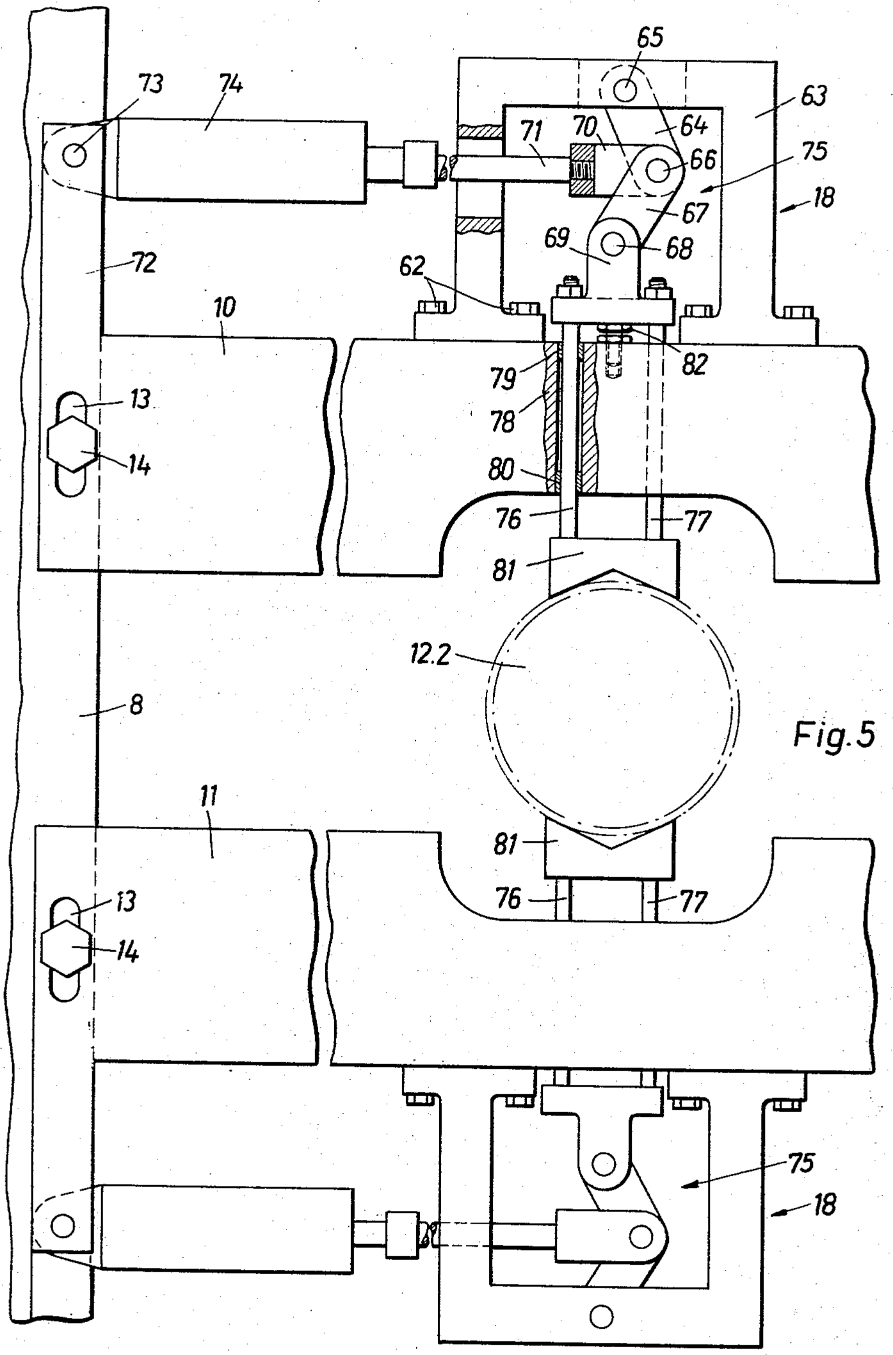
FIG. 5 is a side view of the gripping arrangement.

At the front and rear ends of the machine are stands 8 and 9, on which are fastened two guide rails 10 and 11 extending in the horizontal mid-plane of the frame, which are to receive, in a manner to be described, one or several stators 12.1, 12.2, 12.3. The guide rails lie parallel to each other and are spaced apart vertically by a distance which is adjustable for adapting to the diameter of stator bodies to be wrapped one after the other. The arrangement can, as shown in FIG. 5, be achieved by means of one or several slots 13 in the guide rails and screws 14 threaded through the slots into the stand. But the guide rails can also, as is shown in FIGS. 1 and 2, be adjusted by spindles 15 and 16 provided with left and right hand threads, which are rotatably mounted on the stands 8 and 9 and are threaded in corresponding screw blocks 17 fastened to the guide rails 10 and 11. Each guide rail carries either above or below it a tension arrangement 18 for the stator (to be described further in connection with FIG. 5) near the winding arrangements 4 and 5.

The first transporting cart 3 (FIGS. 3 and 4) is formed by a base plate 19 which is guided by means of lateral and lower guide rolls 20 and 21 in left hand and right hand guide rails 22 and 23 of the machine frame. The base plate carries, parallel to the said guide rails 10 and 11, left hand and right hand standards 24 and 25. Each standard is structurally shaped, and its foot part 26 is fastened on the base plate 19 by means of screws 28 passing through slots 27, so that it is adjustable in a direction transverse to the guide rails 10 and 11. This adjustability is desirable in order to be able to fit the transporting cart to the dimensions of stator bodies. Between the foot part 26 and the head part 29 of each stand are two guide posts 30 and 31, on which a linkage carrying member 32 and a clamping plate carrier 33 are slidably guided. The piston rod 34 of a pressure cylinder 35, which is fastened on the underside of the foot portion 26 of the stand, engages the linkage carrier, the piston rod passing through the base plate 19 by means of a slot 36. On the clamping plate carrier 33 are interchangeable clamping plates 37 and 38, mounted for movement in the direction transverse to the stands 24 and 25. The clamping plates are, for this purpose, fastened with screws 39 to carrying bolt 40, which is guided in the block 41 in its axial direction and is provided with a head 42 and abutment nuts 43. On each linkage carrier 32, each clamping plate carrier 33 and each clamping plate 37, 38, lugs 43, 44 and 45 are secured, respectively, on which by means of pivot pins 46, 47 and 48, links 49, 50 and 51 are journalled, the free ends of which engage a common connecting pin 52, so that the linkage carrier 32, the clamping plate carrier 33 and the clamping plates 37, 38 are connected by a linkage 53.

On the upper edge of each clamping plate 37, 38 is a cut-out 54, which, as is later described, receives the stator 12 to be carried by it. On the edge of the recess 54 positioning pins 55 for the stator body can be arranged, which can engage in corresponding axially arranged adapter bores 56 in a flange of the stator body, so that the stator is held in its exact position with relation to the winding arrangements 4 and 5 and the knotting arrangements 6 and 7.

Figure 3:
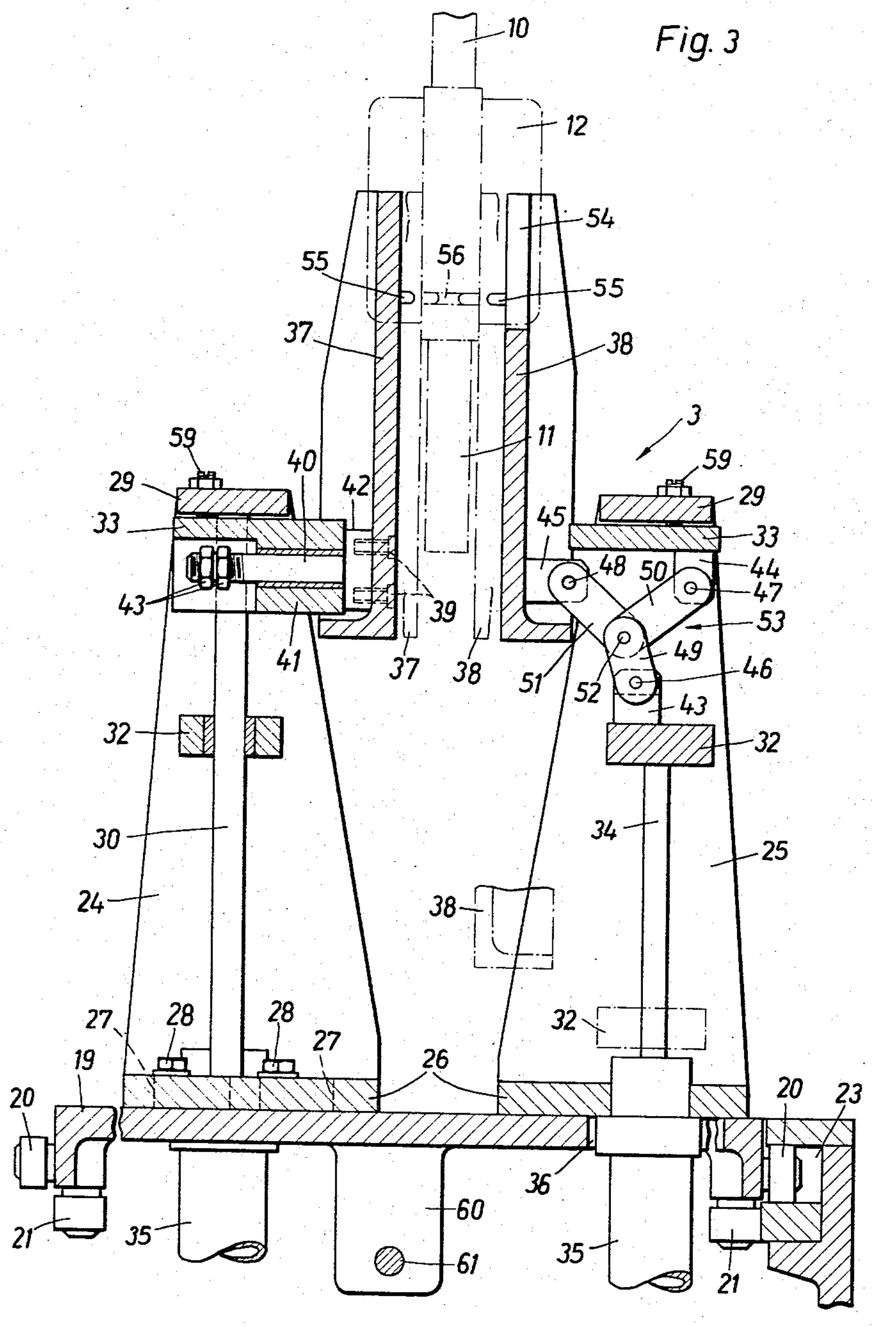
FIG. 3 is a vertical cross section, through one of the transporting carts, the left side on the plane III 1—III 1 and the right side on the plane III 2—III 2 of FIG. 4.

Between the linkage carrier 32 and the clamping plate carrier 33 compression springs 57 and 58 are arranged around the guide posts 30, which serve to transmit the pushing movements produced by the pressure cylinder 35 to the clamping plate. These pushing movements operate, in the upper end position of the clamping plate carrier, to produce through the linkage system 53 which then comes into operation a horizontal displacement of the clamping plates 37 and 38 into positions in engagement with a stator body, as shown in broken lines in FIG. 3. The lowermost end position of the linkage carrier 32 and the clamp plate carrier 33 is shown in FIG. 3 in the broken lines. In order that the uppermost position of the clamping plate carrier can be exactly levelled, adjustable abutment screws 59 are provided in the head part 29 of the standards 24 and 25.

On a projection 60 of the base plate 19 engages the piston rod 61 of a pressure cylinder secured to a machine part, which is not otherwise shown. In this way the transportation cart 3 can be moved back and forth on the machine base 1 between its position for receiving the stator 12.1 and the position between the wrapping arrangements 4 and 5.

As has been stated above, each guide rail 10 and 11 carries above or below it, respectively, a gripping arrangement 18. Because the parts of both these arrangements are constructed similarly, only the upper one is described in the following portion of the specification (see FIG. 5).

A frame block 63 is secured by several screws 62 on the guide track 10, on which a link 64 is pivoted by means of a link pin 65. A second link 67 is pivotally connected to the link 64 by means of a pivot pin 66, and is also pivoted by a pivot pin 68 on a holder 69. A fork 70 engages the pivot pin 66, and is connected with the piston rod 71 of a pressure cylinder 74 journalled on a projection 72 of the guide track 10 by means of a pivot pin 73. The two links 64 and 67 form together with the fork 70 a linkage 75. Two rods 76 and 77 are secured in the holder 69. These rods pass perpendicularly through bores 78, in which they are guided in bearings 79 and 80, the bores being in the guide track 10. The free ends of the rods 76 and 77 carry a clamping member 81, which holds the stator 12 in its position opposite the winding arrangement. In one of the guide tracks, for example the guide track 10, an adjustable abutment screw or stop 82 is arranged, against which the holder 69 engages in its downward movement, so that the stroke of the upper clamping member 81 towards the stator 12 is limited and can be exactly adjusted. The two linkages 75 are so calculated that the linkage which cooperates with the abutment screw 82 undergoes a somewhat greater pressure force than the other linkage, so that each stator 12 when it is gripped takes up the same central position as the preceeding one.

Figure 4:
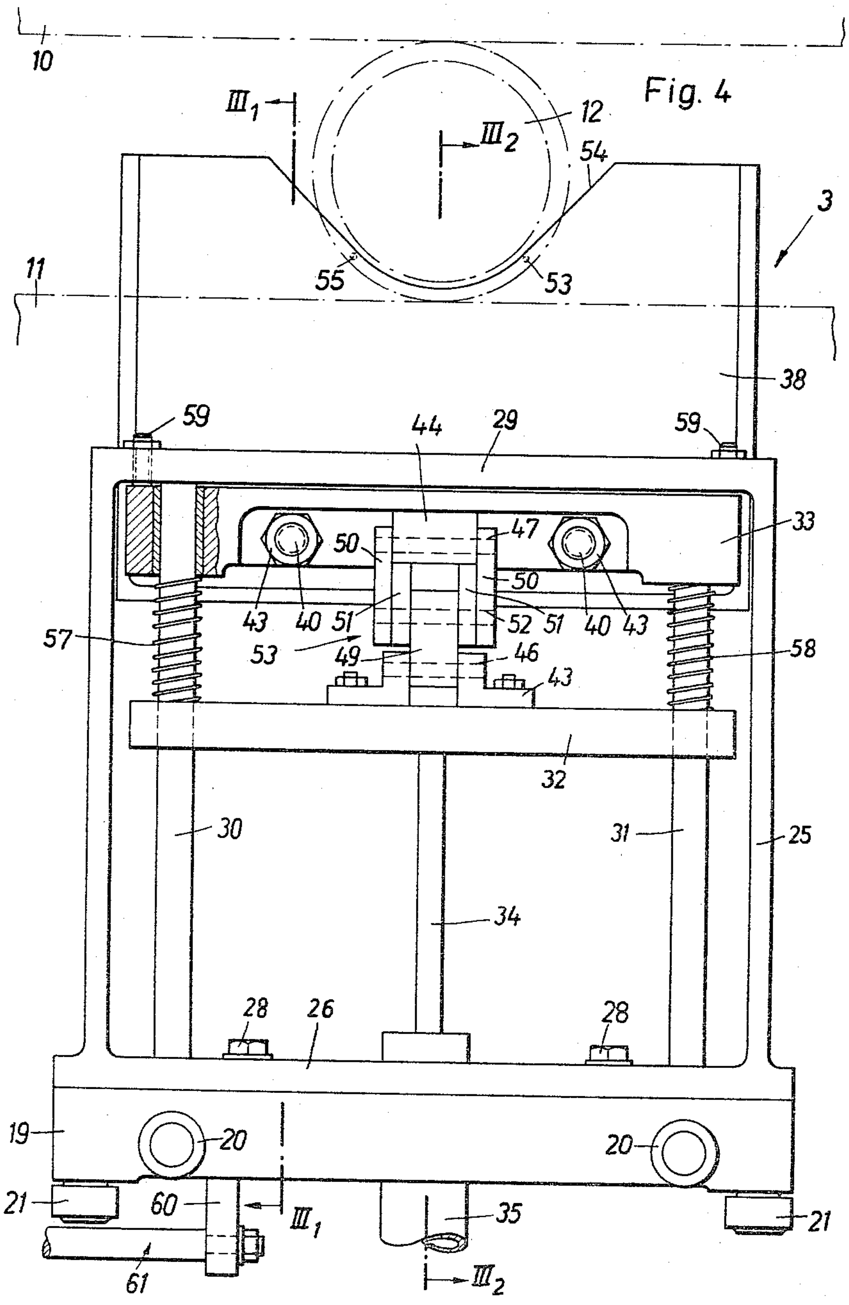
FIG. 4 is an elevation of the cart of FIG. 3 from the right hand side.

The second transportation cart 3' corresponds in its construction with the first transportation cart described in connection with FIGS. 3 and 4. Additionally, this transportation cart 3' has a thread clamping arrangement 83 arranged on its standard 24 and 25, the construction of which is described for the right hand standard 25 in connection with FIGS. 6 to 9.

On the front face 84 of the standard 25 a block 85 is fastened, for example by screws 86. This block carries a rod 88 which is movable in the vertical direction, and settable by means of a clamping screw 87. On the upper end of the rod 88 a carrier plate or frame member 89 is fixed. Between two lateral extensions 90 and 91 of the carrier plate there extend two guide bars 92 and 93 horizontally arranged and parallel to but spaced from each other, which carry, for sliding movement thereon, the plate-shaped base member or bearing plate 94 of the thread clamping arrangement. This base member for this purpose is provided with an offset 95, in which are located two through-bores 96 and 97 which engage the guide rods 92 and 93. Between the projection 95 and the projection 90, each of the guide rods carries a coil spring 98, 99, which serve to press the base member 94 of the thread clamping arrangement to the right in FIGS. 6 and 7. On the front face of the base member 94, a roller holder 102 with a roll 103 is slidably guided in a guide 100 against the operation of a compression spring 101. The roll holder is connected by a rod 104 with a slide or operating member 106 slidably guided in a track 105. The guides 100, 105 are closed by a plate 107 which holds in the roll holder 102 and the member 106.

The member 106 carries a cross pin 108 extending on both sides, on which one end 109 of the link 110 is journalled. At the other end, the link 110 carries a pivot pin 111, on which two more links 112 and 113 are pivoted. The link 112 is journalled by means of a stationary pin 114 on the base member 94, while the link 113 is connected by means of a pivot pin 115 with a clamping lever 116, which on the other hand is pivoted by means of a fixed pin 117 on base member 94. The clamping lever 116 is provided with a horizontally directed clamping section 118, the lower edge of which cooperates with a clamping surface 119 of a counterpiece 120 fixedly arranged on the base member, so that (referring to FIG. 6) swinging of the clamping lever 116 in a clockwise direction separates the clamping surfaces so that they diverge from each other to form a V. On the opposite side of the base member 94 a link 123 is journalled on the end 121 of the cross pin 108, which passes through a slot 122 in the base member. The link 123 is pivoted by a pivot pin 124 to a further clamping lever 125, which additionally is journalled by a stationary pin 126 on the base member 124. The horizontal clamping surface 127 of the clamping lever 125 cooperates with a clamping surface 128 of a counterpiece 129 fastened on the base member. In this case also the clamping surfaces (with reference to FIG. 9) by swinging of the clamping lever 125 in a clockwise direction are separated so that they diverge from each other to form a V. The clamping surface of the clamping lever 125 is provided with a rib-like upward projection 130, which engages in a corresponding recess in the counterpiece 129 in order to increase the clamping action. A knife 131 is secured on clamping lever 125 by means of screws 132, and cooperates with the lower outer edge of the counterpiece 129 to produce a shearing effect.

On the clamping plate carrier 133, a block 134 is fastened by means of screws 131, in which are arranged two rods 137 and 138 which can be held stationary by a clamping piece 135 and a clamp screw 136. These rods carry at their upper ends a pressure plate 139, which presses against the roller 103 when the clamping plate carrier 33 abuts against the abutment screw 59. When such a pressure does not exist, the roller 103 extends further out of the base member 94 through the action of the pressure spring 101, so that the two clamping levers 116 and 125 are opened. As will be explained in detail later, the two clamping levers 116 and 125 must also open when the clamping plate carrier 33 is raised up shortly before the transportation cart 3' reaches its position in front of the knotting arrangement. The base member 94 of the thread clamping arrangement 83 for this purpose abuts against an abutment on the knotting arrangement (to be later described), and is (FIG. 6) shifted to the left against the operation of the springs 92 and 93 until the roller 103 runs over a shoulder 140 on the pressure plate 139 and therefore, can move further out of the base member 94, so that the clamping levers 116 and 125 are turned to their open position. In order that the pressure plate 139 may be capable of being moved freely during the stroke of the clamping plate carrier 33, the head part 29 of the standards 24 and 25 are provided with corresponding openings 141.

The two winding, wrapping or lacing arrangements 4 and 5 are, as shown in FIGS. 1 and 2, arranged on both sides of the machine frame symmetrically to the longitudinal plane thereof, on two cross ramps 142 and 143 rigidly connected with the machine frame. The two wrapping arrangements are similar in construction, and the description is therefore limited to the right hand wrapping arrangement 5 of FIGS. 1 and 2. The main drive of the wrapping arrangement is arranged in a drive housing 144, which, like the previously described transportation cart 3 (FIG. 3), has a base plate 145 on which lateral and downward rollers 146 and 147 are fastened, by which the drive housing is mounted for traversing movement in mating guide tracks of the transverse frame 143 (not shown herein).

The piston rod 148 of a pressure cylinder mounted on the transverse frame is connected to the base plate 145, by which the guide housing is moved in a back and forth direction towards and from the longitudinal midplane of the machine frame 1.

An electric motor 149 is mounted on the drive housing 144, and drives through a suitable transmission a motor shaft 150, which is journalled in bearings 151 and 152. A driver 153 with a driver roller 154 of a six-position Maltese cross starwheel 155 is mounted to turn with the main drive shaft 150. This starwheel is mounted to turn with a shaft 156, which is journalled in a bearing 157 in the drive housing, and the free end of which carries secured to it a gear 158. The shaft 156 is surrounded by a boss 159 projecting out from the drive housing, on which a swinging plate 160 is journalled, which is held in position on the drive housing by a slot therein with a screw 161 passing through it. The member 160 carries on a shaft 162 a double pinion 163 of which the gear 164 meshes with the gear 158 on the shaft 156 and the gear 165 with a ring gear 166, which, as is later described, turns the housing 167 for the needle and thread holder.

The Maltese cross 155 in connection with the twin pinion 163 and the rack 166 produces a step-by-step turning of the housing 167, which is necessary for the winding steps later to be described, and corresponds to the grooves of the stator 12. Through interchanging the two pinions 163 by others with different numbers of teeth, the turning steps of the housing 167 are fitted to the groove spacing. A pinion 168 is connected to turn with the drive disc 153 of the Maltese cross 155, and engages a pinion 169 freely turnable on a sleeve 170 which is itself rotatably journalled in the drive housing 144. This pinion 169 is the input gear of a conventional gear differential 171, not shown in detail, the output shaft 172 of which is turnable in the sleeve 170. A pinion 173 is fastened at the free end of the output shaft 172, which extends into the housing 167 of the needle and thread holder drive.

The purpose of the differential 171 is to make sure that the pinion 173 undergoes relative to the pinion 166 at each interchange of different pinions 163 a complete rotation of 360 degrees more than the ring gear 166. The drive shaft 172 is provided with an axial bore 174, in the end of which thread nozzles 175 and 176 are arranged. Through the axial bore 174 runs a thread 178 running off of a supply spool 177 carried by the drive housing 144 and needed for the wrapping. Secured on the sleeve 170 is the hub 179 of a flange plate 180, on one side of which is fastened the ring gear 166 and on the other the housing 167 by means of screws 180 and 181 and 182. The output drive shaft 172 must be coaxial with the central axis 184 of the stator 12 to be wrapped and for this purpose the needle and the thread holder of the wrapping arrangement for each diameter of the stator must hold its correct position with respect to coil head 185, and for this purpose the fastening flange 186 of the housing 167, as shown in FIG. 12, is provided with several slots 187, through which the fastening screws 182 pass.

The particular drive of the thread holder of the winding arrangement is shown in FIGS. 11 and 18. In the previously described gear housing 167, which is connected by screws to the flange 180 journalled in the drive housing 144, a shaft 189 is journalled in a bearing 188. This shaft carries fixed to it at one end a spur wheel 190 and at the upper end a bevel gear 191. A swingable lever 192 is journalled on the turning flange 189 to turn around the sleeve 170. The lever 192 is held stationary by means of a screw 193 passing through a slot in the member. The lever 192 carries on a pivot pin 194 a loosely turnable double pinion 195, one pinion 196 of which engages with the pinion 173 while the other pinion 197 engages with the gear 190 (although, for clarity, those are not shown in the mesh in FIG. 11). The member is necessary in order, during movement of the housing 167 on the flange 180, which changes the axial distance between the gears 197 and 190, to bring these back into engagement.

As is shown in FIG. 12, during this movement the gear 196 rolls on the gear 173 and the gear 197 can follow the gear 190. The bevel gear 191 engages a bevel gear 198, which is journalled in the housing 167 by means of a shaft 199 and a bearing 200. On the side opposite from the shaft 199 the bevel gear 198 carries an eccentric crank pin 201, which engages in a slide 202. The slide slides in a slot 203 in a gear segment or rack 204, which is journalled by means of a pivot pin 205 in a bearing 206 in the housing 167 and engages a pinion 207 which further is journalled by means of a bearing pin 208 and a bearing 209 in the housing 167. On the side opposite from the bearing pin 208, the pinion 207 is provided with an eccentric crank pin 210 on which a crank arm 211 is journalled. A pinion 213 fastened coaxially on the collar 212 of the crank arm 211 engages an inwardly toothed ring gear 214, which is fastened concentrically with the pinion 208 to the housing 167.

The crank arm 211 carries a crank pin 215, on which a fork 216 is pivotally mounted. This fork carries a rod 219 which is turnable in bearings 217 and 218 but not capable of longitudinal movement. On the forward end of the rod 219 a thread holder 220 is freely mounted, and is fastened by means of a clamping member 221. In order to be able to adjust the length of stroke of the thread holder 220 to correspond to the height of the coil head 185 of the stator, the crank pin 215 is adjustably journalled in a guiding slot 222 in the connecting rod 211.

As is seen in FIGS. 13 and 15, the crank pin 215 for this purpose is provided with a collar 223, which abuts against the connecting rod 211, and extends with guiding surfaces 224 non-rotatably into the guide slot 222. On the other side of the guide slot lies a disc 225 similar to the collar 223, through which the threaded end 226 of the connecting rod 215 passes. A nut 227 threaded on the threaded end draws the collar 223 and the disc 225 firmly against the connecting rod 211.Extending in the longitudinal direction of the guide slot 222 is an adjusting spindle 228 journalled in the crank 211, which passes through a threaded bore 229 in the crank pin 215, so that by loosening the nut 227 and turning the positioning spindle 228 the axial distance between the crank pin 215 and the eccentric pin 210 and in this way the length of stroke of the thread holder 220 can be adjusted.

The thread holder carrying rod 219 is held against axial displacement in the fork 216 by a collar 230 engaging one arm of the fork, and by engagement of its end with a pressure-transmitting ball 231 engaging against a plate 232 connected by screws to the other arm of the fork. A pinion 233 engages the pinion 207 (FIGS. 11 and 13), and is fastened on a shaft 234 the axis of which is parallel to the pivot pin 208. This shaft is journalled in the bearing 235 in the housing 167 and carries on the end remote from the pinion 233 a crank arm 236, the crank pin 237 of which carries a fork 238 similar to the fork 216. The rod 219 which carries the thread holder passes through this fork and is slidably and turnably arranged in it. In order to be able to adjust the width of the stroke of the thread holder 220 to the width of the coil heads 185 of the stator to be wound, the crank pin 237 is displaceable in a guiding slot 239 extending in the longitudinal direction of the crank 236 by means of an adjusting spindle 240. The adjusting spindle is further turnable, but without sliding, in the crank 236 and passes through a threaded bore 241 of the crank pin 237, which can be clamped by means of a nut 242 in the crank. After loosening the nut 242, the axial distance between; the shaft 234 and the crank pin 237 and thus the breadth of stroke of the thread holder 220 can be adjusted.

The toothed gear segment 204, which is shown in FIG. 11 in its mean position, moves through the action of the bevel gear 198 and the eccentric pin 201, during a turning of the bevel gear 198 through 360° through an angle of oscillation of about 45° and the two pinions 207 and 233 thereby turn through 180° in both directions. The pinion 213 journalled on the eccentric pin 210 thus moves upwardly into the teeth of the toothed ring 214 and the two crank pins 215 and 237 undergo, as is shown in FIG. 11*a*, paths 215' or 237' each of 180°, and the eccentric pin 210 moves in a path 210'. For the axial distances existing in FIGS. 11, 11*a* and 13, the crank pins 215 and 237 of the eccentric pins 210 or the shaft 234 result in generally a semicircular path 220' for the thread holder 220, which is adjusted as closely as possible to match the height and breadth of the coil head. In FIG. 11*a* different positions 1 to 4 of the thread holder 220 are shown with the corresponding positions of the cranks 211 and 236.

On the shaft 199 (FIGS. 12 and 18) a crank 243 is fastened opposite the bevel gear 198, the crank pin 244 of which engages in a slide 245, which is reciprocable in a guide 246 of a carriage 249 slidably guided on two posts 247 and 248. The carriage 249 carries a right-angled arm 250, which passes through the housing 167 to the outside and at its outer end by means of a set screw 251 is fastened a needle 253 (provided with an eye 252) so as to be movable towards and from and through the coil head. Because of its length, the needle 253 for exact guiding is preferably passed through a bore 255 coaxial with the needle axis 254 in a guide arm 256 carried by the housing 167. At the lower end of its stroke, the needle 253 enters another bore 257 coaxial with the needle axis in an arm 258 fastened on the housing 167, in order not to bend out of position during the formation of the thread loop which is to be described below. In order to be able to adjust the corresponding proper radial distances between the arms 258 and the coil head 185, the arm is provided with slots 259 and by means of screws 260, which extend through the slots, is fastened adjustably on the housing 167.

During the formation of the thread loop and the sliding off from the thread holder 220, the latter must, as is described hereafter, in its travel from above to below the coil head 185 be turned once through 90° about its longitudinal axis and be drawn back during its return stroke further through 90°. For this purpose, between the crank pin 215 and the thread holder carrying arm 219, a turning arrangement 261 is inserted. This consists of a round disc 262 (FIGS. 16 and 17) fastened on the crank pin 215 of the crank 211, which has a flat upper surface with a notch 263 cut out of the disc and an adjoining raised portion 264 with a flat upper face parallel to the surface of the disc. On the rod 219 which carries the thread holder 220 a disc 265 is fixed, which is positioned transversely to the disc 262. The disc 265 is provided on its periphery with two blocking surfaces 266 and 267 arranged at right angles to each other. On the end of the blocking surface 267 adjacent to the blocking surface 266 is arranged a projection 268, the outer end of which extends beyond the blocking surface 266.

In the position according to FIGS. 16 and 16*a*, the discs 265 lies with its blocking surface 267 on the flat face of the raised portion 264 of the disc 262 and the projection 268 engages with its point in the notch 263 of the disc 264. The arrangement is such that during the movement of the crank pin 215 in its path 215' the disc 262 turns in the direction of the arrow (FIG. 16) relative to the disc 265. The projection 268 of the disc 262 through its engagement in the notch 263 is carried along and thereby turns the disc 265 and so the rod 219 of the thread holder 220 until the projection 268 slides out of the notch 263 and the disc 265 with its blocking surface 266 comes into engagement with the disc 262 (FIG. 17*a*). The thread holder 220 is thereby turned through 90°.

During the continued movement of the crank pin 215 to its next point of reversal in its path 215', the disc 262 turns back beneath the blocking surface 266 of the disc 265, so that a turning of this disc 265 in either direction is blocked by the blocking surface 266. During movement of the crank pin 215 in its path 215' in the opposite direction, and turning of the disc 262 in the direction indicated by the arrow in FIG. 17, the elevation 264 of the disc 262 comes into engagement with the projection 268 of the disc 265 and turns this now back through 90°, so that the projection 268 again enters into the notch 263 and the disc 265 with its blocking surface 267 lies in contact with the flat surface of the raised portion 264 (FIG. 16*a*). The thread holder 220 is then further turned back into its starting position. The turning of the thread holder through 90° follows within an angular turning of the disc 262 through about 45° through its whole turning angle by movement of the crank pin 215 in its path 215' through 180°.

As is particularly shown in FIGS. 26.1 and 26.2, the thread engaging part of the thread holder 220 consists of a hook portion or claw 401 with a wedge shaped tapered hook point 403 directed towards the shaft 402 of the thread holder. Through the whole thickness of the hook extends a recess or notch 405 extending from the foot 404 of the hook, whose width is somewhat greater than the diameter of the needle 253 forming two parallel legs or a forked end. The hook 404 is provided with a cross-groove 406 extending across its whole width, so that at the lower part of the foot of the hook at both sides of the recess 405 a projection 407 is formed.

On both sides of the machine frame 1 (FIG. 2) back of the winding arrangements 4 and 5, and therefore not shown, is a frame, adjustable in its height, on which the knotting arrangements 6 and 7 are fastened. The two knotting arrangements are similar in construction and operation, and only the right hand knotting arrangement 7 of FIG. 2 consequently will be described in connection with FIGS. 19 to 25.

In a knotting housing 269, which is connected in horizontally shiftable relation with the height-adjustable frame 271 by screws 270, the carriage 274 is shiftably mounted on two horizontal parallel spaced guide rods 272 and 273 fastened in the housing and running perpendicularly to the longitudinal middle plane of the machine frame and parallel to the stator axis. On the upper part of the carriage a perpendicular cylinder 275 is mounted, the piston rod of which carries at its free end a rack 278 guided perpendicularly by a guide roller 277 journalled on the carriage. This rack engages a piston 279, which is fastened on a shaft 281 journalled in a bearing 280 in the carriage 274. On the other end of the shaft 281 a driver disc 282 for two Maltese crosses 283 and 284 is fastened by a lock nut 285. The star wheel of Maltese cross 283 is journalled on a pivot pin 286 extending out of the carriage 274 with a lock nut 287. In a similar manner the star wheel of Maltese cross 284 is journalled on a pivot pin 288 with a lock nut 289. Each star wheel is provided with two grooves 290, 291 or 292, 293 located at angles of 90° to each other, which, as is explained later, stand in completely predetermined positions relative to each other. On the driver disc there are, in addition to the conventional holding boss 294, are journalled two drive rollers 295 and 296, which are positioned at an angle of 90° to each other. A roller 298 is journalled on the face of the star wheel 294 opposite from the grooves on an eccentrically located bearing pin 297. A plate-like stand 300 is fastened on the bottom 299 of the housing opposite the star wheel 284, and is provided on the side facing the Maltese cross with a perpendicularly directed guide groove 301. This guide is defined by a stationary rib 302 on one side and on the other side by a swingable bar 305 mounted on a bearing pin 303 by a lock nut 304. The bar 305 is under normal conditions pressed against a stationary abutment 308 by a compressed coil spring 307 arranged between it and a stop 306 carried by the stand 300. The pressure roller 298 fastened on the star wheel 284 engages in the guide 301. A so-called knotting head 310 is journalled in a bearing 309 on the carriage 274. This knotting head consists of a cylindrical body 311, the tapering rounded point 312 of which extends out of the bearing 309. An axial bore 313 extends through the body 311 and there is provided in the front part of the body 311 a slot 314 leading from the outer surface to the axial bore 313, in which a double armed lever 316 is journalled on an axis 315. Through a spring 317 engaging one end of the lever 316 the other end of the lever, which is constructed with an outwardly directed nose 318, is constantly pressed in the direction of the axial bore 313. At the point 312 of the knotting head 310, as is shown in FIGS. 21 and 22, there is formed through removal of the material a claw 312' forming a hook-like thread seizer, which as is later described engages the thread ends for forming a knot. The end of the body 311 within the housing 267 is provided with a bevel gear 319, which meshes with the bevel gear 320 carried by the star wheel 283.

A needle sleeve 321 is slidably positioned in the axial bore 313, which has at its end extending out of the bevel gear 319 a collar 322. A needle 323 is guided through the needle sleeve 321, the enlarged head 324 of which outside the outer end of the sleeve corresponds in diameter to the needle sleeve 321 and is flattened on the sides (FIG. 22). The needle sleeve 321 is under normal conditions pushed so far in the axial bore 319 that, if the needle head 323 with the point were cut off, the sleeve would be flush with the clamping surface 324' of the needle head 324. The inner end of the needle 323 is rigidly connected by a connector sleeve 325 with the piston rod 326 of a pressure cylinder 328 fastened on a perpendicularly directed extension 327 of the frame 300. Between the collar or abutment member 322 of the needle sleeve 321 and the connector sleeve 325, which forms an abutment member, a compression spring 329 surrounding the needle 323 is compressed. A pressure lever 331 is journalled by a bearing pin 330 on stand 300, the free end of which is constructed as a fork 332, which, as later described, can engage the collar 322 of the needle sleeve 321. A rod 334 is pivotally connected to the pressure lever 331 by means of a bearing pin 333, and the rod is also journalled by means of a pivot pin 335 on the carriage 274. The axis of rotation 336 of the knotting head lies in the center line 337 of the upper coil head 184. The star wheel 283 produces the turning movement of the knotting head 310 and the star wheel 284 produces the longitudinal movement.

If the rack 278 moves out of its upper end position shown in FIG. 19 and the pressure cylinder 275 is operated, the downwardly moving rack 278 through the pinion 279 drives the driver disc 282 in the direction of the arrow A, and the driver roller 295 engages in the groove 290 of the star wheel 285 and turns it in the direction of the arrow B through 90°. The transmission ratio between the bevel gear 320 of the star wheel 283 and the bevel gear 319 of the knotting head 310 has a ratio of 1 to 4, so that the turning of the star wheel 283 through 90° turns the knotting head 310 through 360° (see FIG. 29.2). During this first turning of the star wheel 283, the star wheel 284 is blocked against turning by the boss 294. After the turning of the star wheel 283 reaches 90°, the driver roller 295 moves into the groove 291. The groove 290 is then opposite the groove 292 of the star wheel 294, in the position shown in FIG. 19*a*.

Upon further turning of the driver disc 282 in the direction of the arrow A, the driver roller 296 turns the star wheel 283 in the direction of the arrow B through a further 90°, while the driver roller 295 runs idle for a certain distance up to its entrance into the groove 292 of the star wheel 284. This lost motion is so adjusted that within its duration the knotting head 310 is turned through the turning of the star wheel 283 through a further 90° (see FIG. 29.3). The star wheel 284 is now blocked. As soon as the driver roller 295 (FIG. 19*b*) enters the groove 292 of the star wheel 284, the blocking boss 294 releases this star wheel and it is turned with the star wheel 283 in the direction of the arrow C. The roller 298 arranged on the star wheel 284, which is guided in the guide 301 of the stationary stand 300, presses against the rib 302 of the stand and backward movement of the carriage 274 with all its parts is produced, and thus also of the knotting head 310, in the direction of arrow D (FIG. 19).

Because the star wheel 283 is further turned by the driver roller 296 until it leaves the groove 291, a superimposed turning and longitudinal movement of the knotting head 310 through 270° takes place (FIG. 29.4) so that the knotting head with its previously described turning through 90° passes through a complete circle of 360°. The needle sleeve 321 with the needle 323, because it is not connected with the carriage 274, has not taken part in this longitudinal movement, and the needle head 324 is extended out of the knotting head 310 (FIG. 21). As soon as the driver roller 396 leaves the groove 291 of the star wheel 283, the turning of the knotting head stops. But the star wheel 284 is turned still further (FIG. 19*c*) and the movement of the carriage 274 continues until the roller 298 reaches in the groove 301 its furthest sideward position. Before the exit of the driving roll 296 from the groove 291, the knotting head 310 has come up against the collar 322 of the needle sleeve 321, so that this partakes of the further longitudinal movement of the knotting head, whereby the spring 329 (FIG. 19) is compressed.

The outer end of the needle sleeve 321 then lies exactly flush with the front of the knotting head, and the needle head 324 (FIG. 19*c*) extends out of the knotting head, so far that it leaves exposed the clamping surface 324' on the needle head. This is the position shown in FIG. 19*c*. From this position the driver roller 295 turns further up to its exit from the groove 292 of the star wheel 284 through a few degrees, so that the roller 298 now rests against the bar 305 on the stationary stand 300 and the movement of the carriage 274 with the knotting head 310 takes place in the direction of the arrow E (FIG. 19*c*). This movement is produced through the entrance of the driver roller 296 into the groove 293, and continues until the roller comes out of the groove. Thus next the outer end of the needle sleeve 321 moves further to engage against the clamping surface 324' of the needle head 324 and the knotting head 310 is moved further over the stationary needle head 324, until the nose 318 of the lever 316 through operation of the pressure spring 317 is turned into the axial bore 313 and closes it completely (FIG. 23). Upon the exit of the driver roll 295 from the groove 293, the carriage 274 and therewith the knotting head 310 are moved so far that the knotting head is pressed against the coil head 185 (FIG. 23).

Because it can happen that the coil head of a stator may exceed its theoretical size, the pressure with which the knotting head 310 rests against the coil head 185 might exceed the permissible amount. In order to prevent this, the bar 305 on the stationary stand 300, which forms one side of the guide 301 for the roller 298, is mounted yieldably against the operation of the spring 307 (FIG. 20), the spring 307 being so selected that normally a predetermined pressure of the knotting head 310 against the coil head 185 is maintained. If this pressure exceeds the desired value, the bar 305 yields against the pressure of compression spring 307 and the carriage 274 with the knotting head 310 is moved no further forward.

Now the pressure cylinder 328 (FIG. 19) is operated and the needle 323 with the needle sleeve 321 is moved so far from within out of the knotting head 310 (bevel gear 319) that the clamping surface 324' lies outside of the knotting head (FIG. 24). In this position the energization of the cylinder 275 takes place and therewith the backward movement of the rack 278. The previously described cycle of movement of the star wheels at 283 and 284 is reversed and therewith the carriage 274 with the knotting head 310 shifts further backward from its outward position according to FIG. 19. At the beginning of the reverse movement the driving roller 296 engages again in the star wheel 284 and passes through it. During the movement of the carriage thus produced, the pressure lever 331 (FIG. 19) also moves, which during the whole preceding movement of the carriage 274 has swung with respect to the stationary stands 300 without effect. During the withdrawal of the needle 323 from the knotting head 310 by means of the pressure cylinder, as indicated in dotted lines in FIG. 19, the collar 322 of the needle sleeve 321 moves so far to the right that the pressure lever 331 in its outward swinging engages with its fork 332 against the collar 322, and moves it so far to the right against the action of the spring 329 that it shifts the needle sleeve 321 somewhat away from the clamping surface 329 of the needle head 324.

As is clear from FIGS. 19 and 25, a plate 339 is fastened with a number of screws 340 on the wall 338 of the housing 269 which is adjacent the knotting head 310, above the knotting head, and extends in the direction of the longitudinal axis of the machine frame. A carrier arm 342 is journalled on a bearing pin 341 on the bearing plate, and carries on each of the bearing pins 343 and 344 in front of the rounded point of the needle head thread clamping means in the form of double armed clamping levers 345, 346. To one end of each of the clamping levers a link 347, 348 is journalled by means of bearing pins 349, 350, and both links are connected by means of a common pin 351 with the piston rod 352 of a pressure cylinder 353 secured to the arm 342. The free ends of the clamping levers 346 and 345 are provided with opposed clamping surfaces 354 and 355, of which the clamping surface 355, as is shown in FIG. 25, is provided with a projection 356 lying at right angles thereto, in order, as later described, to draw a thread continuously from the middle of the knotting head 310. The free ends of the clamping levers 345 and 346 are displaced with respect to one another by half their thickness, so that they overlap in the clamping position.

A two armed lever 357 is swingably mounted on the bearing pin 344 of the clamping member 345, and has a cutting edge 358 turned towards the clamping surfaces 354, 355 and able to pass over them. The knife 357 is provided with an outwardly directed extension 359 which can engage against an abutment 360 on the bearing plate 339 and an abutment 361 on the arm 342. The knife 357 is connected by a pin 362 to the piston rod 363 of a pressure cylinder 365 pivoted by a bearing pin 364 on the bearing plate 339. If the piston rod 363 is withdrawn into the pressure cylinder 365, the knife 357 swings as shown in FIG. 25 first counterclockwise and cuts through the thread which, as later described, is clamped between the clamping surfaces 354, 355. The extension 359 of the knife then engages against the abutment 361 of the arm 342 and thereby is drawn with the clamping levers 345 and 346 out of the range of the knotting head 310.

On the wall 338 of the housing 269 underneath the knotting head 310 a further bearing plate 366 is fastened by means of several screws 367. A double-armed clamping lever 369 is journalled on a bearing pin 368 and is provided with a clamping surface 370, forming a thread clamping means at the side of the knotting head. The clamping surface has a medial longitudinal groove 371, in which engages a counterpiece 372 fixed on the bearing plate, in order to increase the clamping action. The clamping lever 369 is connected by a pin 373 with a link 374, which in turn is connected by a pivot pin 375 to the piston rod 376 of a pressure cylinder 377 mounted on the bearing plate 366. An abutment 409 is fastened by a screw 408 underneath the bearing plate 366, against which, as is later described, the thread clamping arrangement 83 of the second transporting cart 3' engages.

A block 378 and a bearing plate 381 are also fastened on the housing 269 by means of screws 379 and 380 respectively. This bearing plate carries a supporting arm 383 mounted on a bearing pin 382 so as to be angularly adjustable in a plane parallel to the axis of the knotting heads 310, on the free end of which a clamping lever 384 is journalled on a pivot 385, which has a clamping surface 386 and is connected by a link 388, connected to it by a pin 387, by means of a pin 389 with the piston rod 390 of a pressure cylinder 391 mounted on the swinging arm 383. The clamping lever 384 cooperates with a counterpiece 392 positioned on the arm 383. A pressure cylinder 394 is journalled on the carrier plate 381 by a bearing pin 393, and its piston rod 395 is connected by means of a bearing pin 396 with the swinging arm 383. By operating the pressure cylinder 394 the swinging arm 383 swings out of its upper end position shown in FIG. 19 to a lower end position, so that, as described below, a thread passing out of the stator during movement of the stator from the wrapping arrangement to the knotting arrangement is maintained under tension.

All the pressure cylinders are supplied with pneumatic or hydraulic pressure medium in a manner not shown and are controlled by magnetic valves. At the beginning and end of each path of movement, and sometimes therebetween, for each forward and backward movement of the two transporting carts 3 and 3', the clamping plates 37, 38 on these transporting carts, the drive housings 144 of the wrapping arrangements 4 and 5, the tension arrangements 18, the different swinging and clamping levers on the knotting arrangements 6 and 7, as well as the racks 278 and needles 323 and for the movement of the housing 167, which holds the special drive for the eye needle 253 and the thread holder 220, limit switches are provided, which control the operation of the corresponding magnetic valves and switch off and on the electric motor 149.

Because the arrangement and the operation of the magnetic valve end switches are known to those skilled in the art, in order to simplify the description and prevent multiplicity the description of them is omitted. It is obvious that the end switches are so operated that the cycles of movement follow one another and are coordinated with one another so as to result in a completely automatic carrying through of the wrapping and knotting of the stators. If desired, the cycles of movement can also be controlled individually from a switch board 410 with a corresponding number of control buttons.

The operation of the device is as follows:

In the following, the passage of a first stator 12 through the arrangement is described, so that with reference to FIGS. 1 and 2 the basic operations of the arrangements are carried out, which result in switching off of the arrangement after the passage of the stator. In connection with the wrapping and knotting arrangements only the right hand side is considered.

The first transportation cart 3 stands in its receiving position, the left hand clamping plate 37 (FIG. 3) is raised.

The second transportation cart 3' stands between the two knotting arrangements 6 and 7, in which both the clamping plates 37, 38 are raised and the thread clamping arrangement 83 is closed.

The two wrapping mechanisms 4 and 5 are moved sidewise. The gripping arrangement 18 of FIG. 5 is open. The knotting head 310 with the remainder of the mechanism has the position of FIG. 19. The swinging arm 393 has its upperpost position, the clamping levers 384 are closed. The swinging arm 342 of FIG. 25 is swung downward, the clamping levers 345, 346 and 369 are open.

The operator places in the receiving position of the first transportation cart 3 a stator 12.1 between the two guide tracks 10 and 11 so that the positioning pin 55 of the left hand clamping plate 37 enters into the positioning bore 56 of the stator body. The stator is thus correctly located for all following operations. By pressing a control button, the right hand clamping plate 38 is moved up and the stator is clamped in the transportation cart 3. If the starting button on the switch board 410 has already been pressed, the transportation cart 3 moves to the wrapping arrangements 5 and 4 and simultaneously transportation cart 3' moves out of the wrapping arrangements to the knotting arrangements 6 and 7, whereupon the swinging arm 383 swings into its lowest position. Then the transportation cart 3 comes directly in front of the wrapping arrangements 4 and 5, the clamping arrangement 18 is advanced and the stator 12.1, like the stator 12.2 in FIG. 2, is clamped. Simultaneously the clamping levers 345, 346 and 369 of the knotting mechanism close (FIG. 25). The clamping plates 37 and 38 of the transportation cart 3 release the stator and travel to their lowest position and the transportation cart 3 moves back to its receiving position, whereupon the left hand clamping plate 37 moves upward again.

Figure 10:
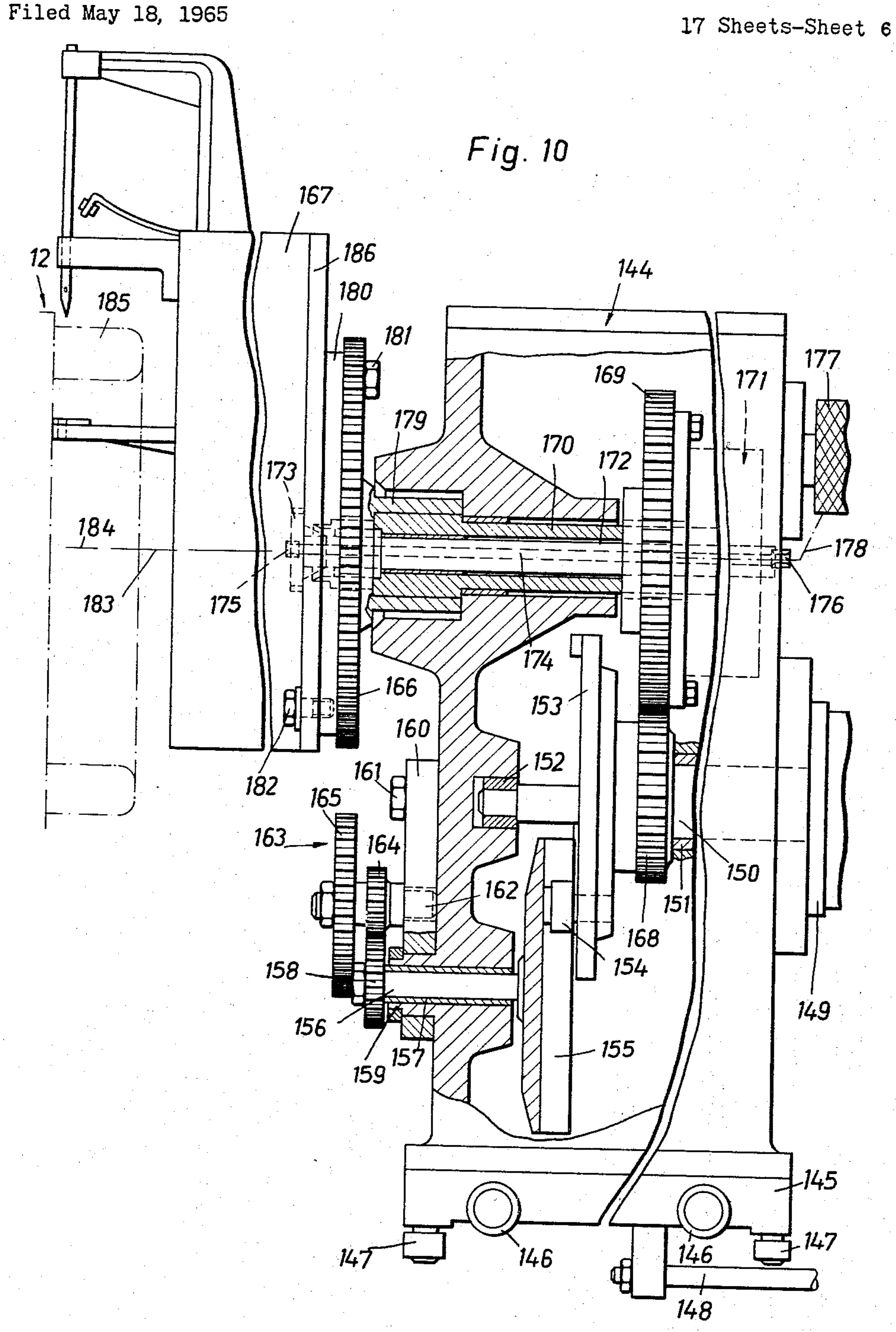
FIG. 10 is a perpendicular cross-section through the main drive of the winding or wrapping arrangement.

After the transportation cart 3 has come into its receiving position, the two wrapping arrangements 4 and 5 are advanced to working positions with respect to the stator. Simultaneously the swinging arm 383 goes back to its uppermost position (FIG. 19). From the thread supply spool 177 (FIGS. 10 and 11) a thread 178 is drawn through the different thread nozzles 175, 176 and a conventional thread clamp to the needle eye 253 and from there to the thread gripper 178' of the swinging arm 383 (FIG. 19) and is held stationary by means of the clamping lever 384 on the clamping surface 386. With the lacing apparatus in operating position, the electric motor 149 is switched on and the lacing procedure begins. This is particularly explained with relation to FIGS. 26.1 to 26.11.

The needle 253 (FIG. 26.1) in its outermost position is located above the coil head 185 and the thread lifter 220 with its claw 401 is in its outermost highest position above the winding head 185 and underneath the needle 253, and is so turned that the point or hook portion 403 of the claw lies on the side facing the winding head. Thus the recess 405 in the claw 401 is aligned with the needle 253. The thread lifter 201 is held in this position without turning by the cooperation of the turning discs 262 and 265 of the turning arrangement 251 as shown in FIGS. 16 and 16*a*. The point of the needle 253 is positioned directly in front of the gap between the stator grooves or coil bundles.

From this position (FIG. 26) the needle 253 is advanced by the forward movement of the carriage 249 (FIG. 12) into the gap between two coil bundles, and the thread holder 220 through the action of the toothed gear section 420 (FIG. 11) is moved towards the right, while between the positions of FIG. 26.1 and FIG. 26.2 the turning device 261 (FIGS. 16 and 16*a*) operates and the thread holder 220 turns through 90° about its longitudinal axis, so that it has the position shown in FIG. 26.2, in which the claw point 403 lies on the side turned towards the needle.

In the following cycle of movement, the needle 253 and the thread holder 220 take, with respect to the winding heads 185 and each other, intermediate positions corresponding to FIGS. 26.3 to 26.5, with the thread holder 220 passing outside the coil head 185 and then below it to the position of FIG. 26.6. As soon as the thread holder 220 has reached its position shown in FIG. 26.6, the needle 253 has also reached its most advanced position and is engaged in the hole 257 of arm 258 and the thread 178 is drawn somewhat beyond the hook 401 of the thread holder 220 and lies immediately adjacent the hook point 403.

When the positions of the thread holder 220 and needle 253 of FIG. 26.6 are reached, a reversal of the movement of the two gear segments 204 and the connected operating parts (FIGS. 11, 12 and 13) takes place and the withdrawal of the needle 253 and the thread holder 220 begins. At the beginning of the withdrawal of the thread holder 220, the hook point 403 moves between the needle 253 and the portion 178' of the thread 178 lying in front of the needle. Simultaneously, the needle 253 moves through the intermediate positions of FIGS. 26.7 to 26.10 to its upper end position of FIG. 26.11, which corresponds to the starting position of FIG. 26.1, and the thread lifter 220 is simultaneously moved back from the position of FIG. 26.6 through the positions of FIGS. 26.7 and 26.10 to the position of FIG. 26.11, being shifted out and then forward, so that a thread loop 411 is formed.

During the travel of the thread holder 220 from the position of FIG. 26.9 to the position of FIG. 26.10, the lower part 412 of the thread loop 411 which has been formed is caused to lie in the cross-groove 406 of the hook foot 404, whereas the upper part 413 of the thread loop remains below the point of the hook.

During the passage of the thread holder 220 from the position of FIG. 26.10 to the position of FIG. 26.11, the turning arrangement 261 comes into action and the discs 262, 263 are turned back from the positions of FIGS. 17 or 17*a* to the positions of FIGS. 16 or 16*a*, and thus the thread holder 220 is further turned through 90° about its longitudinal axis, so that the hook point 403 is directed towards the coil head 185. This turning of the thread holder 220 has the effect that the upper part 413 of the thread loop 411 (FIG. 26.10) slides over the hook point 403 and is held only in the cross-groove 406 of the hook foot 404. Because, as is clearly shown in FIG. 26.1, the cross-groove 406 lies underneath the needle 253 and somewhat to the left of the needle point, when the operating cycle begins again from the position shown in FIG. 26.1 the thread loop 411 is pushed out to the left out of transverse groove 406 by the point of the needle which is again moved forward and is drawn from the thread 178 carried along by the needle 253 up to the coil head and tightened. In this way the first winding is formed.

The thread holder 220 now moves back idly to its position of FIG. 26.6, the needle simultaneously moves from its position of FIG. 26.1 to its position of FIG. 26.6 draws a new thread loop 411' on the inside of the coil head 185 and the drawing of the thread loop over the coil head and the meshing with the thread 178 begins again, so that the phase sequence shown in FIGS. 26.1 to 26.11 is continued until the coil heads of the stator are covered. In FIG. 27, for the sake of easier understanding of the thread path of the wrapping operation resulting from the interlooping of the thread loops, three thread loops 411 to 411'' are shown. The lacing of the coil head of the other side of the stator proceeds in a similar way and at the same time.

Figure 8:
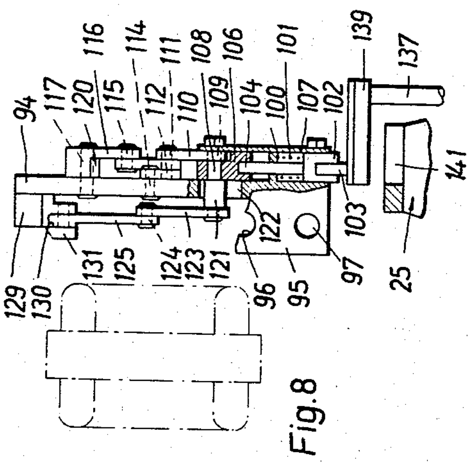
FIG. 8 shows an end view of the thread clamping arrangement according to FIG. 6, in the direction of the arrow VIII of FIG. 6.
Figure 9:
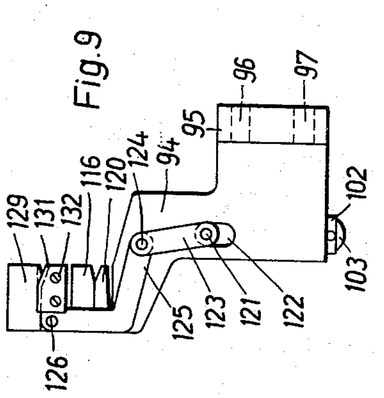
FIG. 9 is a rear view of the thread clamping arrangement according to FIG. 6.
Figures 6, 7:
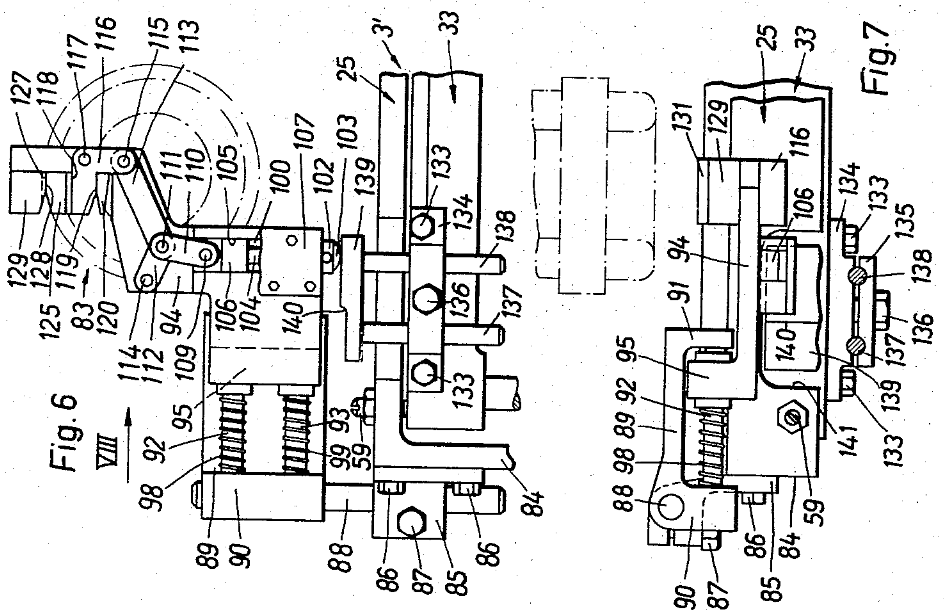
FIG. 6 is a front view of the thread clamping arrangement on the transporting cart.
FIG. 7 is a top plan view of the thread clamping arrangement according to FIG. 6.

At the end of the lacing process, that is, when the needle 253 and the thread holder 220 have performed a full circumference of 360° around the stator 12.2, the electric motor 149 is switched off, the needle 253 and the thread holder 220 taking the positions of FIG. 26.9 At the same time, the two wrapping arrangements 4 and 5 move out sidewise, while the thread loop 411 is drawn by the thread holder 220 away from the stator 12.2 and a thread path corresponding to that shown in FIG. 28 results, Simultaneously the two clamping plates 37, 38 of the transporting cart 3' move into their lowest position, while the respective thread clamping arrangement 83 associated with them open, through downward movement of the pressure plate 139 and operation of the pressure spring 101 (FIG. 8). Subsequently the transportation cart 3' moves from its previous position between the knotting arrangements 6 and 7 into the position between the wrapping arrangements 4 and 5 and the section of thread lying between the needle 253 and stator 185 is gripped by the clamping lever 125, and the uppermost (FIG. 28) thread section 412 of the thread loop 411 is gripped by the clamping lever 116.

When now the clamping plates 37, 38 of the transportation cart are raised, in order to clamp the stator 12.2, the previously discussed thread sections are held fast between the clamping surfaces 127, 128 and 118, 119 (FIG. 6) and the thread 178 coming from the needle 253 is separated by the knife 131 on the clamping lever 125 on the side nearest the coil head 185. In the meanwhile the gripping arrangement 18 (FIGS. 2 and 5) has released the stator 12.2 and the transportation cart 3' moves with the stator 12.2 and the clamped thread into a position between the knotting arrangement 6 and 7. The result is that the thread 178 coming from the supply spool 177 is drawn through the needle 253 by the clamps 125, 129, the loop thread 413 by the clamps 116, 121 is drawn out of the coil head 185 and out of the thread holder 220. In order for the beginning part 178' of the thread which is clamped in the clamps 384, 392 of the swinging arm 383 during movement of the stator to its position between the knotting arrangement 6, 7 to be kept constantly under tension, the swinging arm 383 is advanced by the same amount as the stator from its uppermost position (FIG. 19) to its lowest position above the clamping levers 345, 346 and 369. During the movement of the transportation cart 3' between the knotting arrangements 6, 7 before the transportation cart has reached its final position at the middle of the knotting head 310, the thread clamping arrangement 83 abuts against the stationary abutment 409 on the housing 269 of the knotting arrangement and remains, under the action of the pressure spring 98 (FIG. 6) in this position where it does not interfere with the knotting head 310 (not shown). Because transportation cart 3', when the thread clamping arrangement 83 presses against the abutment 409, still moves somewhat farther, the roller 103 of the thread clamping arrangement rides over the step 140 of the pressure plate 139, so that the clamping of the thread is relaxed, and the thread part is only lightly clamped.

When the transportation cart 3' stands in front of the knotting head 310, in such a position that the center line 337 of the upper coil head 185, of the stator indicated at 12.3, as is seen in FIG. 19, is aligned with the turning axis 336 of the knotting head 310, first the clamping lever 369 (FIG. 20) closes and fastens the thread end which is clamped in the thread clamping arrangement 83, that is, both legs of the loop of thread 412 drawn off by the thread holder 220 and the beginning 178' of the thread clamped in the swinging arm 383, which form a loop around the coil head, so that they have the position shown in broken lines in FIG. 28. Directly after the closing of the clamping lever 369, the clamping levers 345, 346 close, and thereby grip the threads 412 and 178' (FIG. 28) and draw them exactly to the middle of the knotting head 310, where they lie beneath the gripper 312' (FIG. 29.1) of the knotting head 310.

Simultaneously the clamping lever 384 at the bottom of the swinging lever 383 opens and releases the previously gripped thread starting section 178'. The swinging lever 383 is moved back to its uppermost position, and takes hold of the thread 178 which is held fast by the clamping lever 125 of the thread clamping arrangement 83 and pulls this out of the thread clamping arrangement, so that the thread is available for a new wrapping procedure.

When this step is completed, the pressure cylinders 275 of the knotting arrangements 6 and 7 are energized and each rack 278 begins its upward movement. The knotting procedure is explained with reference to FIGS. 29.1 to 29.6, in connection with the description of FIGS. 19 to 24.

The initial position of the knotting head 310 at the beginning of the knotting procedure, along with the position of the thread end 178 and the thread end 412 are shown in FIG. 29.1, and the driving parts in FIGS. 19 and 20. By the previously described first turning of the knotting head 310 through 360° the thread beginning and thread end are drawn by the gripper 312' and twisted three-fourths of the circumference of the knotting head (FIG. 29.2). Now occurs the superimposed turning and backward movement of the knotting head 310 through a turning angle of 270° (FIG. 29.4) so that the needle head 324 moves out of the knotting head, so far that the clamping surface 324' on the needle head lies outside of the needle sleeve 321 (FIG. 19c) and the thread beginning 178' and thread end 412 are drawn between the clamping surface and the needle sleeve and are gripped (FIGS. 29.4 and 21).

Now the clamping levers 345, 346 and 369 (FIG. 29) are opened through the operation of the pressure cylinders 353 and 377, as is shown in FIG. 29.5, and the knotting head 325 is moved forward to its position against the coil head 185 (FIG. 23) over the stationary needle head 324, so that the threads 178' and 412 are now held fast by the needle head 324 and drawn into the axial bore 313 of the knotting head (FIG. 29.5). In the same degree as the needle head disappears into the knotting head, the nose 318 of the levers 316 through operation of the pressure spring 317 enters the axial bore 313 and closes this down to the thread thickness.

Now the pressure cylinder 328 (FIG. 19) on which the piston rod of the needle 323 is fastened is energized and the needle 323 which is holding the threads 178' and 412 along with the needle sleeve 321 is drawn backwards out of the knotting head 310 (FIGS. 29.6 and 24). As a result the loop of thread 414 which is wound around the knotting head is drawn over the point 312 of the knotting head onto the thread part coming from the winding head and into the axial bore 313. In these conditions, as is seen in FIGS. 23 and 24, the knotting head 310 is pressed against the coil head 185, the needle sleeve 321 with the needle 323 and needle head 324, carrying with them the threads 178' and 412, are drawn backwards out of the knotting head, and the axial bore 313 is closed down to the thread thickness by the nose 318 of the lever 316. For this reason the knot 415 which has been formed cannot be drawn into the axial bore 313 and is completed and drawn tight between the winding head 185 and the point 312 of the knotting head 310 (FIG. 29.6).

Through the backward movement of the carriage 274 which now begins, through the pressure lever 331, as is described in connection with FIG. 19, the clamping between the needle head 324 and the needle sleeve 321 is released, so that the threads 178' and 412 fall out of their grip. After a short backward movement of the knotting head 310 through the operation of the pressure cylinder 353 (FIG. 25) the clamping levers 345, 346 are again closed and grip the threads 178' and 412 lying behind the knot 315 in front of the knotting head 310. Now the pressure cylinder 365 is operated (FIG. 25) and the knife 357 cuts the threads 178' and 412 behind the knot 415 (FIG. 29.6) and the swinging arm 342 (FIG. 25) swings upward, so that the remainder of the thread is pulled out of the knotting head 310. The knotting procedure is then ended and all the operating parts of the knotting arrangement have the starting position shown in FIG. 19.

The coil head 185 (FIG. 23) which has been pressed during the formation of the knot 415 by the knotting head 310 has, after the removal of the knotting head and later on, a tendency to return to its original height, so that the knot remains continuously drawn up and cannot loosen by itself.

After the end of the knotting procedure, the clamping plates 37, 38 of the transportation cart 3' of the stator 12.3 are released, and moved to their lowest positions. The completely wrapped and knotted stator is removed from the guides 10 and 11 by hand. But it can also remain in its position and thereafter be pushed out of the guide rails by the next following stator.

The various arrangements have now been restored to their original positions for the carrying out of the whole cycle, the thread 178 running from the supply spool 177 being drawn through the eye of the needle 253 up to the swinging lever 383 and there clamped.

In the meanwhile, the operator has positioned a stator 12.1 in the receiving position of the transportation cart 3 and between the guide rails 10, 11 so that another passage of the stator through the whole arrangement with automatic controls of the operation follows.

The transportation cart 3 can in its outer position be connected with a suitable feed conveyor (not shown) so that the feeding of the stators from a supply source and the insertion into the transportation cart 3 and between the guide rails 10 and 11 can be carried out automatically, the conveyor in the course of the whole procedure being moved automatically so that a completely automatic passage of the stators through the whole arrangement is achieved.

The whole cycle of movement can be modified in that, instead of a stator 12.1 in the area of the transportation cart 3, a stator 12.2 between the wrapping arrangements 4 and 5 and a stator 12.3 betwen the knotting arrangements 6 and 7, with the wrapping and knotting arrangements working on different stators, for example, as soon as the stator 12.2 is pushed out by the transportation cart 3 from the wrapping arrangements 4 and 5 as the stator 12.3 is pushed to the knotting arrangements 6 and 7, a new stator 12.1 is brought in place of the stator 12.2 from the transportation cart 3 from its receiving position to the wrapping arrangements 4 and 5 and after the withdrawal of the transportation cart 3 to the receiving position a new stator 12.1 is brought within its range.

While we have described herein some embodiments of our invention, we wish it to be understood that we do not intend to limit ourselves thereby except within the scope of the claims hereto or hereinafter appended.

We claim:

1. Apparatus for lacing the coil heads of windings positioned in the stator of an electrical machine, comprising means for lacing a thread in successive loops around the coil heads, means for knotting the ends of the laced thread, a pair of parallel guide rails, said lacing means and said knotting means being located closely adjacent said guide rails at spaced positons therealong to operate on a stator guided thereby, said guide rails extending at both ends beyond said lacing and knotting means, means to introduce a stator between the guide rails and to move it into a first position in operative relation to the lacing means, and means to move a laced stator from such position to a second position in operative relation to the knotting means.

2. An apparatus as claimed in claim 1, comprising a machine frame having its longitudinal axis parallel to the guide rails and having transverse frames thereon extending perpendicular to said stator axis and located one beside the other, said lacing means and said knotting means being mounted on said transverse frames, said stator moving means comprising carriers movably mounted in said machine frame for movement in the direction of such axis.

3. In apparatus as claimed in claim 1, said lacing means comprising a gear housing, means mounting said gear housing to turn about an axis through the center of a stator positioned in operative relation thereto, a thread supply, a needle having an eye therein to receive thread from said supply, means mounting said needle in said gear housing for movement towards and from and through the coil head, a thread holder, and means in the housing mounting the thread holder with respect to the needle for movement to form therewith successive loops around the coil heads of the stator.

4. An apparatus as claimed in claim 1, comprising a machine frame having its longitudinal axis parallel to the guide rails and having a transverse frame thereon extending perpendicular to said stator axis, said lacing means including a gear housing, and means mounting said gear housing on said transverse frame for movement towards and from the guide rails.

5. In apparatus as claimed in claim 1, said lacing means comprising a gear housing, means mounting said gear housing to turn about an axis through the center of a stator positioned in operative relation thereto, a first bevel gear journalled in said gear housing, means to drive said bevel gear at constant speed, a member journalled in said gear housing having first and second crank pins on opposite sides thereof and having a second bevel gear engaged with said first bevel gear, a rack journalled in said gear housing having a slot therein engageably cooperating with said first crank pin, guide means in said gear housing, a carriage guided by said guide means, a thread supply, a needle with an eye for receiving thread from said supply, said carriage having a slot therein engageably cooperating with the second crank pin, a first pinion journalled in said gear housing engaging said rack and having a third crank pin thereon, a second pinion journalled in said gear housing meshing with said first pinion, a third pinion journalled on said third crank pin, an internally toothed ring gear fixed to said gear housing concentrically with said first pinion and meshing with said third pinion, a first crank arm connected to said third pinion, a second crank arm connected to said second pinion, said crank arms having fourth and fifth crank pins thereon respectively, said fourth and fifth crank pins having first and second holders thereon, respectively, a rod turnably mounted in said holders and slidable in one of the holders, and a thread holder carried by said rod.

6. In apparatus as claimed in claim 5, said holders comprising first and second forks journalled on said fourth and fifth crank pins, respectively, each crank arm having a slot therein, and means for adjustably securing said fourth and fifth crank pins in said slots.

7. In apparatus as claimed in claim 5, means carried by said first holder and said rod for turning said rod about its longitudinal axis in response to movement of said fourth and fifth crank pins.

8. In apparatus as claimed in claim 5, said holders comprising first and second forks journalled on said fourth and fifth crank arms, said fourth crank pin having a first disc secured thereon within said first fork, said first disc having a notch in its periphery and a projection from one face at a point adjacent said notch, said rod having secured thereon within said first fork a second disk on the same side of the first disc as said projection, said second disc having two straight peripheral edge portions at right angles to each other engageable with said side of the first disc and having a projection between said edge portions engageable in said notch, whereby swinging of said fourth crank arm causes said rod to turn about its longitudinal axis.

9. In apparatus as claimed in claim 8, said machine having a drive housing, said gear housing mounting means comprising a flange secured to said gear housing, and means mounting said flange on said drive housing to turn about said stator axis, a third pinion connected to said first bevel gear to turn therewith, an arm mounted on said gear housing for angular adjustment about an axis parallel to the axis of said first bevel gear, a double pinion journalled on said arm, one pinion member of said double pinion meshing with said third pinion, a shaft extending from said drive housing into said gear housing coaxial with the axis of adjustment of said arm, and a fourth pinion fixed on said shaft meshing with the other pinion member of said double pinion.

10. In apparatus as claimed in claim 8, said machine having a drive housing, said gear housing mounting means comprising a flange secured to said gear housing, said drive housing having a drive shaft journalled therein to turn about an axis parallel to said stator axis, a sleeve turnably mounted on said drive shaft, said flange being secured to said sleeve, a third pinion connected with said flange, an arm mounted on said drive housing for angular adjustment about an axis parallel to said stator axis, a double pinion journalled in said arm, said third pinion engaging one pinion member of said double pinion, a fourth pinion engaged with the other pinion member of said double pinion, and means connected to said drive shaft to impart step-by-step movement to said fourth pinion.

11. In apparatus as claimed in claim 8, said machine having a drive housing, said gear housing mounting means comprising a flange secured to said gear housing, said drive housing having a drive shaft journalled therein to turn about an axis parallel to said stator axis, a sleeve turnably mounted on said drive shaft, said flange being secured to said sleeve, a third pinion connected with said flange, an arm mounted on said drive housing for angular adjustment about an axis parallel to said stator axis, a double pinion journalled in said arm, said third pinion engaging one pinion member of said double pinion, a fourth pinion engaged with the other pinion member of said double pinion, and means connected to said drive shaft to impart step-by-step movement to said fourth pinion, a fifth pinion connected to said first bevel gear to turn therewith, a second arm mounted on said gear housing for angular adjustment about an axis parallel to the axis of said first bevel gear, a second double pinion journalled on said second arm, one pinion member of said second double pinion meshing with said fifth pinion, and a sixth pinion fixed on said shaft meshing with the other pinion member of said second double pinion.

12. Apparatus as claimed in claim 11 in which said means for imparting step-by-step movement comprises a second shaft on which said fourth pinion is mounted, a motor shaft, a Maltese cross drive having a driver mounted on said motor shaft and a cooperating star wheel mounted on said second shaft, said motor shaft being connected to said drive shaft.

13. Apparatus as claimed in claim 11 in which said means for imparting step-by-step movement comprises a second shaft on which said fourth pinion is mounted, a motor shaft, a Maltese cross drive having a driver mounted on said motor shaft and a cooperating star wheel mounted on said second shaft, and a differential connecting said motor shaft to said drive shaft.

14. Apparatus as claimed in claim 10 in which said means for imparting step-by-step movement comprises a second shaft on which said fourth pinion is mounted, a motor shaft, a Maltese cross drive having a driver mounted on said motor shaft and a cooperating star wheel mounted on said second shaft, said motor shaft being connected to said drive shaft.

15. An apparatus as claimed in claim 10, comprising a machine frame having its longitudinal axis parallel to the guide rails and having a transverse frame thereon extending perpendicular to said stator axis, said lacing means including a gear housing, and means mounting said gear housing on said transverse frame for movement towards and from the guide rails, said gear housing mounting means comprising a drive housing, means mounting the gear housing on the drive housing to turn coaxially with the stator axis, rails carried by said transverse frame member, and horizontal and vertical rollers journalled on said drive housing and engaging said rails.

16. In apparatus as claimed in claim 1, said knotting means comprising a knotting housing having guide means therein, a knotting head carriage mounted on said guide means for movement in the direction parallel to the axis of a stator positioned in operative relation to the knotting means, a knotting head mounted in said carriage for turning about an axis parallel to the stator axis, and means carried by the knotting housing for advancing and retracting the knotting head and for turning it about said axis.

17. In apparatus as claimed in claim 16, said last means comprising two Maltese cross star wheels journalled on said carriage about parallel axes and each having a peripheral recess and grooves therein, a driver disc having two driver rollers engageable in said grooves and a boss engageable in said recesses, a driver disc shaft on which said driver disc is secured journalled in said carriage, a driver disc pinion on said driver disc shaft, and means to drive said driver disc pinion.

18. In apparatus as claimed in claim 17, said grooves in each of said star wheels including two grooves at right angles to each other connecting at a common point, said grooves, driver rollers and boss being so related that during the outward movement of a first driver roller from said common point in a first groove of a first star wheel the second star wheel is locked by said boss; a short distance after leaving the first groove of the first star wheel the first driver roller enters a first groove of the second star wheel; the boss continuing to lock the second star wheel; during movement of the first driver roller in the first groove of the second star wheel the boss releases the second star wheel; the second driver roller enters the second groove of the first star wheel as the first driver roller is leaving such groove, so as to turn such first star wheel; the boss locks the first star wheel as the second driver roller leaves the second groove of the first star wheel.

19. In apparatus as claimed in claim 18, a first gear connected with said first star wheel to turn therewith, a second gear meshing with said first gear and secured to said knotting head, said knotting housing having a groove therein extending perpendicularly with respect to said guide means and a pressure roller journalled eccentrically on the second star wheel engaging in said groove.

20. In apparatus as claimed in claim 19, said winding head comprising a cylindrical body having a longitudinal bore therethrough, the free outer end of said body extending out of said knotting housing and having a rounded form, said body having a longitudinally extending slot in such free end connecting said bore to the outside and having a portion of said free end cut away to form a hook-like thread seizer, a lever journalled on said body having a nose portion engaged in said slot adjacent the free end of the body, means on the body urging the nose portion into the slot, and a needle slidable in said bore for movement between a position extending beyond the free outer end of the body and a second position in which it is outside the body at its inner end.

21. In apparatus as claimed in claim 20, a sleeve slidable within said bore, said needle being slidable within said sleeve and having a head portion at the outer end of the sleeve of the same outside diameter as the sleeve, said needle head having a clamping surface spaced from the free end thereof engageable with the outer end of the sleeve, and means operatively connected to the needle for moving it back and forth.

22. In apparatus as claimed in claim 21, said sleeve and said needle having abutment members thereon within the housing, a compression spring between said abutment members normally urging the needle head against the sleeve, and means responsive to movement of the carriage away from the stator to shift the sleeve against the action of the spring so as to release the engagement between the needle head and the sleeve.

23. In apparatus as claimed in claim 22, two thread clamping means a first one in front of the rounded point and a second one at the side of the knotting head.

24. In apparatus as claimed in claim 23, the first thread clamping means comprising two levers swingable about a common axis, the second clamping means comprising a stationary member and a lever pivoted for swinging into engagement therewith, and operating means connected to each of said levers.

25. In apparatus as claimed in claim 24, a carrier arm journalled on said knotting housing, said first thread clamping means being carried by said carrier arm for movement towards and away from the knotting head, said second thread clamping means being mounted on said knotting housing.

26. In apparatus as claimed in claim 25, a two-armed lever journalled on said carrier arm, the first arm of said two-armed lever having a knife edge movable across said first thread clamping means, said carrier arm having two stops thereon in the path of the second arm of the two-armed lever, and means connected to the second lever arm to swing it between two end positions in engagement with the stops, to cut thread held by said first clamping means and to move out of the range of the first clamping means.

27. In apparatus as claimed in claim 26, a supporting arm pivoted on said knotting housing to swing about an axis transverse to the direction of movement of the knotting head, and third thread clamping means carried by said supporting arm for movement into a position adjacent said knotting head.

28. In apparatus as claimed in claim 27, said third clamping means comprising a clamping member fixed to said supporting arm and a clamping lever pivoted on said supporting arm, and means carried by said supporting arm to move said clamping lever into engagement with said clamping member.

29. In apparatus as claimed in claim 1, means mounting said knotting means for vertical adjustment.

30. In apparatus as claimed in claim 1, clamping means carried by said guide rails at a point opposite the lacing means to clamp a stator body in operative position relative thereto.

31. In apparatus as claimed in claim 30, said clamping means comprising clamping members, means slidably mounting said clamping members on the guide rails for movement towards and from each other, and means to move said clamping members to clamp a stator therebetween.

32. In apparatus as claimed in claim 31, adjustable stop means carried by one of said guide rails in the path of one of said clamping members to limit the movement of such clamping member towards the other clamping member.

33. In apparatus as claimed in claim 1, said stator introducing means comprising a structure movable in the direction of said guide rails, a pair of vertical posts carried by said structure, a pair of vertical clamping plates, and means mounting said clamping plates on said posts for vertical movement from a lowered position to a raised position on opposite sides of said rails and for movement towards each other in such raised position to clamp a stator therebetween.

34. In apparatus as claimed in claim 33, a second structure movable in the direction of said guide rails between an operative position with respect to said lacing means and an operative position with respect to said knotting means, and thread clamping means carried by said second structure comprising a frame member, a bearing plate mounted on said frame member for horizontal movement, an operating member guided for vertical movement in the bearing plate, said bearing plate having two clamping surfaces, clamping levers journalled on said bearing plate engageable with said clamping surfaces operatively connected to said operating member, and means engageable with said operating member to move the same.

35. In apparatus as claimed in claim 34, said means to move the operating member comprising a part carried by said structure having a surface with two portions at different distances from the path of movement of said bearing plate, and means connected with said operating member engageable with said surface portions as said bearing plate moves with respect to the frame member.

36. In apparatus as claimed in claim 34, thread cutting means carried by said second structure adjacent said clamping means.

37. A machine for lacing and knotting the coil heads of stators of electrical machines, comprising lacing means, means to move a stator into and hold it in operative relation with said lacing means, a thread supply, means to operate said lacing means to draw off thread from such supply and to lace the coil heads of a stator held by such holding means, means to grip the end of a thread passing from said supply through said lacing means, knotting means adjacent said lacing means, a cart movable between a position in operative relation to said knotting means and a position in operative relation to said lacing means, first and second clamping means carried by said cart and operable when the cart is in operative relation with the lacing means to clamp a thread laced around a coil head at points on opposite sides of such coil head, means to cut off said thread at a point between the first clamping means which grip the portion of the thread more remote from the gripping means and the coil head, thereby leaving a loop of thread around the coil head means on said cart to grip a stator, means to move such cart into operative relation to said knotting means, a third clamping means adjacent such knotting means to clamp both legs of the loop of thread held by said second clamping means and said gripping means, a fourth clamping means adjacent said knotting means for clamping said thread legs between the third clamping means and the coil head, means for then releasing the gripping means and at least partially releases the first and second clamping means, and means for then operating the knotting means to knot the thread legs between the third and fourth clamping means.

38. In apparatus as claimed in claim 37, said lacing means comprising a housing, means mounting said housing to turn about the axis of a stator held in operative relation with said lacing means, a needle having an eye, means mounting the needle in said housing for movement towards and from such axis inside coil heads of a stator held in such relation, a thread holder having two parallel legs forming a forked end through which said needle can pass, said legs having hook portions directed away from the stator and having grooves in their outer ends, means in said housing for moving the needle towards and from the axis of the stator, and means in the housing for turning the thread holder and moving it in a generally semicircular path in synchronism with the needle to advance and withdraw the thread holder within and out from within the stator when the needle is in the part of its movement nearest said axis, the thread holder with its hook directed towards the needle to catch a thread held by the needle and extending interiorly of the coil head, to shift the thread holder outwardly of the stator during the outward movement of the needle towards its position most remote from the stator, to advance the thread holder towards the needle on the outside of the stator, to turn the thread holder during such advancing movement through 90° with the hook portion directed towards the stator axis and the thread engaged in said grooves until the fork lies in the path of the needle, to move the needle towards the stator axis within the loop engaged in said grooves, and to withdraw the thread holder away from the stator and move it towards the stator axis as the needle moves towards the stator axis.

39. In apparatus as claimed in claim 38, said means for moving the thread holder comprising a rod on which the thread holder is mounted, first and second rod guiding members, said rod being turnable in each of said members and being slidable in the first of said members only, and means to oscillate said members in arcuate paths about axes spaced from one another.

40. In apparatus as claimed in claim 39, said means for turning the thread holder comprising cooperating means on said rod and on the second of said rod guiding members, said means being responsive to the oscillation of the second guiding member to turn the rod.

41. Apparatus for lacing the coil ends of a stator comprising a housing, means to hold a stator in operative relation with the housing, a needle having an eye, means mounting the needle in said housing for movement towards and from the axis of a stator held in such relation and inside the coil heads thereof, a thread holder having two parallel legs forming a forked end through which said needle can pass, said legs having hook portions directed away from the stator and having grooves in their outer ends, means in said housing for moving the needle towards and from the axis of the stator, and means in the housing for turning the thread holder and moving it in a generally semicircular path in synchronism with the needle to advance and withdraw the thread holder within and out from within the stator when the needle is in the part of its movement nearest said axis, the thread holder with its hook directed towards the needle to catch a thread held by the needle and extending interiorly of the coil head, to shift the thread holder outwardly of the stator during the outward movement of the needle towards its position most remote from the stator, to advance the thread holder towards the needle on the outside of the stator, to turn the thread holder during such advancing movement through 90° with the hook portion directed towards the stator axis and the thread engaged in said grooves until the fork lies in the path of the needle, to move the needle towards the stator axis within the loop engaged in said grooves, and to withdraw the thread holder away from the stator and move it towards the stator axis as the needle moves towards the stator axis.

42. Lacing means for stator comprising a gear housing, means mounting said gear housing to turn about an axis through the center of a stator positioned in operative relation thereto, a first bevel gear journalled in said gear housing, means to drive said bevel gear at constant speed, a member journalled in said gear housing having first and second crank pins on opposite sides thereof and having a second bevel gear engaged with said first bevel gear, a rack journalled in said gear housing having a slot therein engageably cooperating with said first crank pin, guide means in said gear housing, a carriage guided by said guide means, a thread supply, a needle with an eye for receiving thread from said supply, said carriage having a slot therein engageably cooperating with the second crank pin, a first pinion journalled in said gear housing engaging said rack and having a third crank pin thereon, a second pinion journalled in said gear housing meshing with said first pinion, a third pinion journalled on said third crank pin, an internally toothed ring gear fixed to said gear housing concentrically with said first pinion and meshing with said third pinion, a first crank arm connected to said third pinion, a second crank arm connected to said second pinion, said crank arms having fourth and fifth crank pins thereon respectively, said fourth and fifth crank pins having first and second holders thereon, respectively, a rod turnably mounted in said holders and slidable in one of the holders, and a thread holder carried by said rod.

43. In apparatus as claimed in claim 42, means carried by said first holder and said rod for turning said rod about its longitudinal axis in response to movement of said fourth and fifth crank pins.

44. In apparatus as claimed in claim 42, said holders comprising first and second forks journalled on said fourth and fifth crank arms, said fourth crank pin having a first disc secured thereon within said first fork, said first disc having a notch in its periphery and a projection from one face at a point adjacent said notch, said rod having secured thereon within said first fork a second disc on the same side of the first disc as said projection, said second disc having two straight peripheral edge portions at right angles to each other engageable with said side of the first disc and having a projection between said edge portions engageable in said notch, whereby swinging of said fourth crank arm causes said rod to turn about its longitudinal axis.

45. In apparatus as claimed in claim 44, said machine having a drive housing, said gear housing mounting means comprising a flange secured to said gear housing, and means mounting said gear housing on said drive housing to turn about said stator axis, a third pinion connected to said first bevel gear to turn therewith, an arm mounted on said gear housing for angular adjustment about an axis parallel to the axis of said first bevel gear, a double pinion journalled on said arm, one pinion member of said double pinion meshing with said third pinion, a shaft extending from said drive housing into said gear housing coaxial with the axis of adjustment of said arm, and a fourth pinion fixed on said shaft meshing with the other pinion member of said double pinion.

46. In apparatus as claimed in claim 44, said machine having a drive housing, said gear housing mounting means comprising a flange secured to said gear housing, said drive housing having a drive shaft journalled therein to turn about an axis parallel to said stator axis, a sleeve turnably mounted on said drive shaft, said flange being secured to said sleeve, a third pinion connected with said flange, an arm mounted on said drive housing for angular adjustment about an axis parallel to said stator axis, a double pinion journalled in said arm, said third pinion engaging one pinion member of said double pinion, a fourth pinion engaged with the other pinion member of said double pinion, and means connected to said drive shaft to impart step-by-step movement to said fourth pinion.

47. In apparatus as claimed in claim 44, said machine having a drive housing, said gear housing mounting means comprising a flange secured to said gear housing, said drive housing having a drive shaft journalled therein to turn about an axis parallel to said stator axis, a sleeve turnably mounted on said drive shaft, said flange being secured to said sleeve, a third pinion connected with said flange, an arm mounted on said drive housing for angular adjustment about an axis parallel to said stator axis, a double pinion journalled in said arm, said third pinion engaging one pinion member of said double pinion, a fourth pinion engaged with the other pinion member of said double pinion, and means connected to said drive shaft to impart step-by-step movement to said fourth pinion, a fifth pinion connected to said first bevel gear to turn therewith, a second arm mounted on said gear housing for angular adjustment about an axis parallel to the axis of said first bevel gear, a second double pinion journalled on said second arm, one pinion member of said second double pinion meshing with said fifth pinion, and a sixth pinion fixed on said shaft meshing with the other pinion member of said second double pinion.

48. In apparatus as claimed in claim 38, said knotting means comprising a knotting head having a substantially cylindrical body with a rounded outer end, means mounting the knotting head in the knotting housing for axial movement towards and away from a stator positioned in operative relation to the knotting means in a path parallel to the stator axis and for turning about its axis, said body portion having a bore therethrough, first and second thread gripping members movable from a point within the knotting housing outside the knotting head into the knotting head, said thread gripping members being slidable with respect to one another in a direction parallel to the stator axis, the first thread gripping member being movable beyond the outer end of the knotting head, said thread gripping members having cooperating thread gripping surfaces thereon engageable and disengageable by relative sliding movement between the thread gripping members, means resiliently urging said thread gripping members to slide with respect to each other to cause engagement of said thread gripping surfaces, resiliently operated means on said body normally closing said bore, said means being openable by the movement of the first thread gripping member into the bore, said body having a thread engaging hook on the outside of the rounded end thereof, means for first turning the knotting head around its axis through 360° during which said hook catches thread portions clamped in said third and fourth clamping means and wraps them 270° around the body, the thread gripping members being within the bore, means for then turning the body through an additional 270° and moving it axially away from the stator, the thread gripping members remaining stationary so that the first thread gripping member extends out of the outer end of the body and the thread portions engage between and are gripped by the thread gripping surfaces, and means for then producing relative axial movement between the body and the thread gripping members such that the thread gripping members are outside the body on the side remote from the stator and pull with them the thread portion wrapped around the body and sliding off the rounded end thereof, said bore closing means closing the bore during such relative axial movement to all but the thickness of the thread portions, whereby the knot formed is drawn against said closing means and tightened.

49. In appaartus as claimed in claim 48, said body having a slot therein connecting said bore to the outside, said bore closing means comprising a lever pivoted to said body having one end engaging in and resiliently pressed into said slot.

50. In apparatus as claimed in claim 49, said knotting head mounting means comprising a carriage slidably mounted in said housing to move in a path parallel to the stator axis, said knotting head being journalled in said carriage, and means responsive to movement of the carriage to its position most remote from the stator to release said gripping members.

51. In apparatus as claimed in claim 50, said means to turn the knotting head comprising a first star wheel of a Maltese cross drive journalled in the carriage, and means operatively connecting said first star wheel to said knotting head, means to move said carriage comprising a second star wheel of a Maltese cross drive journalled in the carriage, said housing having a groove therein transverse to the direction of movement of the carriage, a member on said second star wheel engaging in said groove, and a common driver wheel having two driver rollers thereon operatively engageable with said star wheels.

52. Knotting mechanism comprising a knotting housing, a knotting head having a substantially cylindrical body with a rounded outer end, means mounting the knotting head in the knotting housing for axial movement towards and away from a stator positioned in operative relation to the knotting head in a path parallel to the stator axis and for turning about its axis, said body having a bore therethrough, first and second thread gripping members movable from a point within the knotting housing outside the knotting head into the knotting head, said thread gripping members being slidable with respect to one another in a direction parallel to the stator axis, the first thread gripping member being movable beyond the outer end of the knotting head, said thread gripping members having cooperating thread gripping surfaces thereon engageable and disengageable by relative sliding movement between the thread gripping members, means resiliently urging said thread gripping members to slide with respect to each other to cause engagement of said thread gripping surfaces, first and second clamping means adjacent said knotting head, resiliently operated means on said body normally closing said bore, said means being openable by the movement of the first thread gripping member into the bore, said body having a thread engaging hook on the outside of the rounded end thereof, means for first turning the knotting head around its axis through 360° during which said hook catches thread portions clamped in said first and second clamping means and wraps them 270° around the body, the thread gripping members being within the bore, means for then turning the body through an additional 270° and moving it axially away from the stator, the thread gripping members remaining stationary so that the first thread gripping member extends out of the outer end of the body and the thread portions engage between and are gripped by the thread gripping surfaces, and means for then producing relative axial movement between the body and the thread gripping members such that the thread gripping members are outside the body on the side remote from the stator and pull with them the thread portion wrapped around the body and sliding off the rounded end thereof, said bore closing means closing the bore during such relative axial movement to all but the thickness of the thread portions, whereby the knot formed is drawn against said closing means and tightened.

53. Knotting means comprising a knotting housing having guide means therein, a knotting head carriage mounted on said guide means for movement in the direction parallel to the axis of a stator positioned in operative relation to the knotting means, a knotting head mounted in said carriage for turning about an axis parallel to the stator axis, and means carried by the knotting housing for advancing and retracting the knotting head and for turning it about said axis, said last means comprising two Maltese cross star wheels journalled on said carriage about parallel axes and each having a peripheral recess and grooves therein, a driver disc having two driver rollers engageable in said grooves and a boss engageable in said recesses, a driver disc shaft on which said driver disc is journalled in said carriage, a driver disc pinion on said driver disc shaft, and means to drive said driver disc pinion.

54. In apparatus as claimed in claim 53, said grooves in each of said star wheels including two grooves at right angles to each other connecting at a common point, said grooves, driver rollers and boss being so related that during the outward movement of a first driver roller from said common point in a first groove of a first star wheel the second star wheel is locked by said boss; a short distance after leaving the first groove of the first star wheel the first driver roller enters a first groove of the second star wheel; the boss continuing to lock the second star wheel; during movement of the first driver roller in the first groove of the second star wheel the boss releases the second star wheel; the second driver roller enters the second groove of the first star wheel as the first driver roller is leaving such groove, so as to turn such first star wheel; the boss locks the first star wheel as the second driver roller leaves the second groove of the first star wheel.

55. In apparatus as claimed in claim 54, a first gear connected with said first star wheel to turn therewith, a second gear meshing with said first gear and secured to said knotting head, said knotting housing having a groove therein extending perpendicularly with respect to said guide means and a pressure roller journalled eccentrically on the second star wheel engaging in said groove.

56. In apparatus as claimed in claim 55, said winding head comprising a cylindrical body having a longitudinal bore therethrough, the free outer end of said body extending out of said knotting housing and having a rounded form, said body having a longitudinally extending slot in such free end connecting said bore to the outside and having a portion of said free end cut away to form a hook-like thread seizer, a lever journalled on said body having a nose portion engaged in said slot adjacent the free end of the body, means on the body urging the nose portion into the slot, and a needle slidable in said bore for movement between a position extending beyond the free outer end of the body and a second position in which it is outside the body at its inner end.

57. In apparatus as claimed in claim 56, a sleeve slidable within said bore, said needle being slidable within said sleeve and having a head portion at the outer end of the sleeve of the same outside diameter as the sleeve, said needle head having a clamping surface spaced from the free end thereof engageable with the outer end of the sleeve, and means operatively connected to the needle for moving it back and forth.

58. In apparatus as claimed in claim 57, said sleeve and said needle having abutment members thereon within the housing, a compression spring between said abutment members normally urging the needle head against the sleeve, and means responsive to movement of the carriage away from the stator to shift the sleeve against the action of the spring so as to release the engagement between the needle head and the sleeve.

References Cited

UNITED STATES PATENTS

| | | | |
|---|---|---|---|
| 2,142,108 | 1/1939 | Burdett | 112—2 |
| 2,465,665 | 3/1949 | Slavek | 112—2 |
| 2,883,949 | 4/1959 | Ammann | 112—2 |
| 3,050,019 | 8/1962 | Muskulus | 112—2 |
| 3,083,653 | 4/1963 | McGill | 112—2 |

JORDAN FRANKLIN, *Primary Examiner.*

J. R. BOLER, *Assistant Examiner.*